United States Patent
Arai et al.

(10) Patent No.: US 7,071,641 B2
(45) Date of Patent: Jul. 4, 2006

(54) MOTOR CONTROL APPARATUS, AND WASHING MACHINE AND DRYING MACHINE USING THE SAME

(75) Inventors: Yasuhiro Arai, Osaka (JP); Hideki Nakata, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/896,009

(22) Filed: Jul. 22, 2004

(65) Prior Publication Data
US 2005/0104552 A1 May 19, 2005

(30) Foreign Application Priority Data
Jul. 23, 2003 (JP) .............................. 2003-278333

(51) Int. Cl.
*H02P 6/18* (2006.01)
(52) U.S. Cl. .................. 318/254; 318/439; 318/722
(58) Field of Classification Search ................ 318/138, 318/254, 430–434, 437, 439, 720–724
See application file for complete search history.

(56) References Cited

U.S. PATENT DOCUMENTS

| 6,388,416 B1 * | 5/2002 | Nakatani et al. ............ 318/700 |
| 6,710,562 B1 * | 3/2004 | Kalb et al. .................. 318/434 |
| 6,850,031 B1 * | 2/2005 | Nakata et al. .............. 318/801 |
| 6,856,109 B1 * | 2/2005 | Ho .............................. 318/254 |
| 6,864,660 B1 * | 3/2005 | Veltman ...................... 318/801 |
| 2002/0149342 A1 | 10/2002 | Nakata et al. |

FOREIGN PATENT DOCUMENTS

| EP | 1 237 274 | 9/2002 |
| EP | 1 378 990 | 1/2004 |
| JP | 9-253379 | 9/1997 |
| JP | 2002-360970 | 12/2002 |
| JP | 2003-204694 | 7/2003 |

* cited by examiner

*Primary Examiner*—Bentsu Ro
(74) *Attorney, Agent, or Firm*—Wenderoth, Lind & Ponack, L.L.P.

(57) ABSTRACT

A motor control apparatus includes an inverter circuit for supplying driving power to a motor, a motor current detector for detecting current flowing through the motor, an inverter controller for controlling the inverter circuit based on the output of the detector. The inverter controller has a setting unit for setting various command values to control motor driving status, and a processing unit for controlling the inverter circuit based on the setting on the setting unit. The setting unit sets command value so that a load angle which is an angle between rotor axis and motor applied voltage is operated on the smaller side of the angle that provides the maximum output torque in the load angle-output torque characteristics.

11 Claims, 23 Drawing Sheets

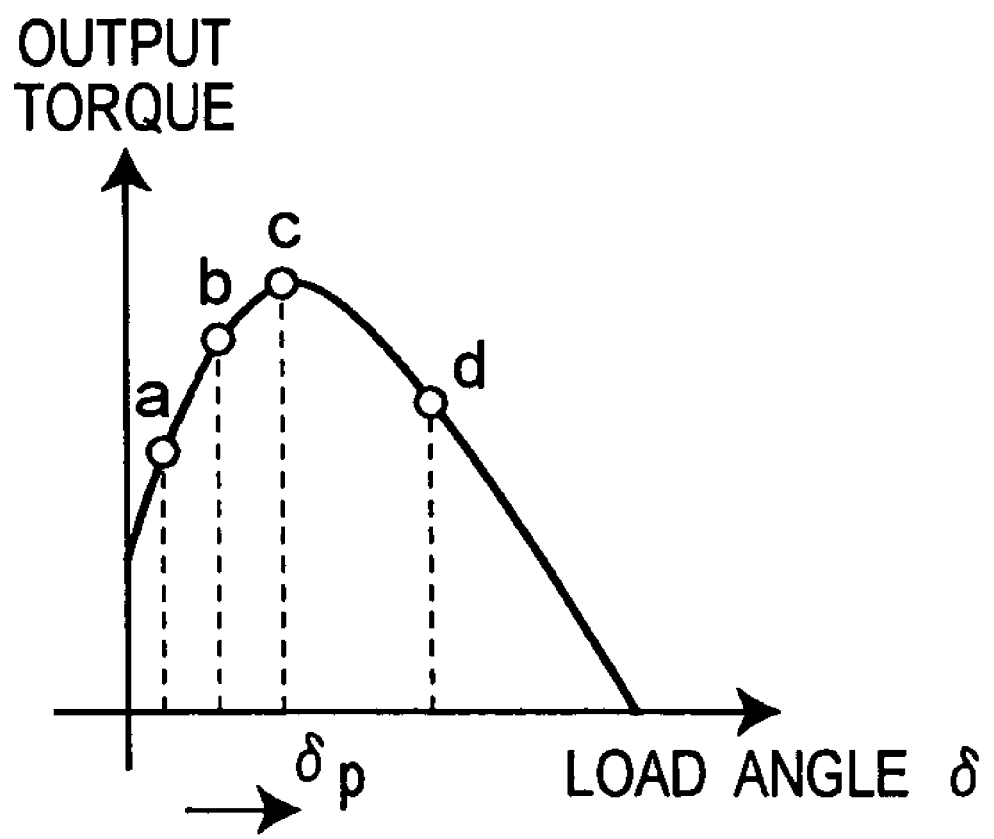

※WITH A CONSTANT APPLIED VOLTAGE

MOTOR CONTROL APPARATUS, AND WASHING MACHINE AND DRYING MACHINE USING THE SAME

BACKGROUND OF THE INVENTION

1. Technical Field

The present invention relates to a motor control apparatus for controlling a synchronous motor, and more particularly to a motor control apparatus for controlling a motor without using position sensors, and an electric appliance having such a motor control apparatus.

2. Related Art

Hitherto is known a so-called fully automatic washing machine automating all processes from washing to dewatering.

A conventional fully automatic washing machine is, for example, designed to detect the cloth amount (laundry amount) put in a washing-dewatering tank before start of washing in order to carry out the processes smoothly from washing to dewatering. In the conventional detecting method of cloth amount, a Hall element is used to detect a rotational phase of a rotor in the motor, and the motor is driven to a specified speed by detecting rotational phase of the rotor based on a signal from the Hall element. At that time, a motor current is also detected, and the motor current flowing while the motor rotates at predetermined speed is summed. Based on the summed motor current and the inertia time of the motor after the driving signal is stopped and until the motor slows down to a predetermined speed, the cloth amount is detected (see patent document 1).

In other prior art (refer to as "second prior art"), a technique without using position sensors to detect the cloth amount is disclosed. This detects a current flowing through the motor to estimate the rotation phase and rotating speed of the rotor, and detects the cloth amount using the torque axis current component obtained by vector operation (see patent document 2).

A motor control apparatus in a different prior art (refer to as "third prior art") detects the reactive current supplied in the motor, and controls by feedback so that this value may reach the target value (see patent document 3). The third prior art is explained below by referring to FIG. 24.

FIG. 24 is a block diagram of the motor control apparatus in the third prior art. In the diagram, direct-current voltage of a direct-current power source 701 is converted into alternating-current voltage by an inverter circuit 702, and is supplied to a motor 703 by way of a motor current detector 704.

In an inverter controller 55, a processing unit 58 creates and outputs PWM command from a command value for the motor applied voltage, and controls switching elements of the inverter circuit 702 to drive the motor 703. At this time, the motor current detector 704 detects the current flowing in the motor 703 and outputs a detection signal. A detector 57 calculates a reactive component of the motor current on the basis of the detection signal. A setting unit 56 outputs a rotation frequency command value and a reactive current command value. The processing unit 58 generates applied voltage command by calculation based on the error of reactive current command value and reactive current detection value, generates PWM command value from the applied voltage command to output it to the inverter 702, thereby controlling the inverter circuit 702 again in next control cycle.

Patent document 1: JP 09-253379A
Patent document 2: JP 2002-360970A
Patent document 3: JP 2003-204694A The washing machine in the first prior art includes a position sensor for detecting motor driving and cloth amount, but the position sensor such as Hall element is expensive and wiring for the position sensor signal is required, which is contradictory to reduction of size and lowering of cost. Further, the position sensor has a lower allowable temperature of ambient temperature as compared with allowable temperature of the motor. Especially, in the washing-drying machine for operating continuously from washing to drying, the mounting position of the position sensor is limited, and it is a significant restriction when designing the mechanism of the washing-drying machine.

Besides, depending on the position error in mounting the position sensor, the actual phase of the rotor may be different from the phase signal output from the Hall element. In this case, the controller calculates and determines the applied voltage using the wrong phase signal, and thus the motor efficiency may be out of the best point. Hence the motor efficiency may be lowered or the vibration noise may be caused. Further, if the position sensor is broken, the motor cannot be driven at all, and the reliability of the entire washing machine is sacrificed.

The washing machine in the second prior art has no position sensor and thus has an advantage in that problems caused by the position sensor do not occur as described to the first prior art. However in the case of a drum washing machine, during washing operation, laundry is lifted up by the rotating tank and falls down before reaching the top. This washing operation causes one drop of the laundry every rotation of the rotating tank from 90 degrees to 180 degrees, and the drop of the laundry causes a large change of the load which is a large change of the load on the motor rotating the rotating tank. Rotating speed of the tank should be low, because high rotating speed causes the laundry to stick to the rotating tank by centrifugal force, the laundry does not drop down and the stain on the laundry is not removed. The second prior art in which the rotor position is estimated from the motor current without using position sensors has a low limit of rotating speed required for estimating the position. Applied to a washing machine, such as the drum washing machine, which is driven at low rotating speed and accompanied with large change of load, the second prior art may cause a position estimation deviating from the actual value and may not be able to follow up the load fluctuations, resulting in going out of tune. In the second prior art, the motor is driven with vector control and load torque or other factors equivalent to it must be detected. As described above, the load changes suddenly depending on the action of the drop of the laundry, and thus it is hard to detect the load torque, causing the drive of the drum washing machine using the second prior art to be impossible.

Since the control apparatus of the sensorless DC motor in the third prior art is thus configured, when the load torque variation amplitude in rotation is steep and large, deviation of the current feed phase causes the lowered motor efficiency, vibration due to speed fluctuations, and out-of-tune.

Further no consideration has been given to detecting means of out-of-tune due to sudden load variations or protective means in case of oscillation.

SUMMARY OF THE INVENTION

It is hence an object of the invention to present a motor control apparatus of small size, low cost and high reliability, capable of obtaining stable rotation without using position sensors even when the load torque fluctuation is large, and capable of detecting out-of-tune and oscillation due to sudden load fluctuations.

In the first aspect of the invention, a motor control apparatus of the invention includes an inverter circuit that supplies driving power to a motor, a motor current detector that detects the current flowing in the motor, and an inverter controller that controls the inverter circuit on the basis of the output from the motor current detector. The inverter controller includes a setting unit that sets various command values for controlling the operation state of the motor, and an operating unit that controls the inverter circuit so as to achieve the operation state on the basis of setting by the setting unit. The setting unit sets the command value so that the load angle as an angle between the rotor axis and motor induced voltage may be positioned on a smaller side than the load angle for providing the maximum output torque in the characteristic of the load angle and output torque.

The inverter controller may further include a load amount detecting unit that detects the load amount of the motor. The load amount detecting unit may detect the load amount by detecting any one of active current, phase difference $\phi$ between applied voltage command value and motor current, phase difference a between applied voltage command value and motor induced voltage, and phase difference $\beta$ between q-axis as the rotor axis and motor current. At this time, the setting unit may set the operation state of the motor on the basis of the load amount obtained from the load amount detecting unit. Further, the load amount detecting means may detect the load amount of the motor at least either upon start of motor driving or during motor driving.

Preferably, the setting means may control the load angle on the basis of command value for commanding reactive current, command value for commanding phase difference $\phi$ between applied voltage command value and motor current, command value for commanding phase difference a between applied voltage command value and motor induced voltage, or command value for commanding phase difference $\beta$ between q-axis of rotor axis and motor current.

Further, the inverter controller may further include abnormal state detecting unit for detecting abnormality of the motor on the basis of change amount of motor current. At this time, the setting unit changes the setting so as to perform a predetermined process when detecting motor abnormality. For example, the setting unit may set so as to stop motor operation once abnormality is detected by the abnormality detecting unit, and to resume motor operation after the operation state is restored.

In the second aspect of the invention, a motor control apparatus includes an inverter circuit that supplies driving power to a motor, a motor current detector that detects the current flowing in the motor, and an inverter controller that controls the inverter circuit on the basis of the output from the motor current detector. The inverter controller includes a load amount detecting unit that detects the load amount. The load amount detecting unit determines the active current component of the motor current, and calculates the change amount from the active current component of motor current obtained in the previous cycle, and compares the change amount with a predetermined value. When the change amount is smaller than the predetermined value, It increases gradually the reactive current component of the motor current, until the change amount of the active current component of motor current exceeds the predetermined value. It judges the load amount on the basis of the reactive current component of the motor current at this time, when the change amount is more than the predetermined value.

According to the invention, a washing machine can be provided in which stable rotation is obtained without using position sensors even in the case of occurrence of large fluctuations of load torque of the rotor such as in drum type washing machine, out-of-tune and oscillation due to sudden and large load fluctuations can be detected, the size is reduced, the cost is lowered, and the wiring is simplified, there is less restriction in motor mechanism design, and reliability is high.

According to the invention, since the feedback control period is short, a washing machine of higher stability is presented. Moreover, the control loop can be formed without using motor parameters, and thus the washing machine immediately applicable to motors having different motor parameters can be presented. The number of motor parameters to be used can be saved, and thus a washing machine of simplified adjustment can be presented. The motor also can be controlled without using current minor loop because of not performing vector control, the amount of arithmetic operation is curtailed, and a washing machine using an inexpensive microcomputer can be presented.

According to the invention, if abnormality such as out-of-tune occurs after start of motor driving, the abnormality can be detected without using position sensors. When abnormality is detected, the set value can be set anew depending on the load fluctuation, and it is possible to resume operation after onset of out-of-tune, and a washing machine capable of driving the motor even in the event of unexpected occurrence of load fluctuation can be realized.

BRIEF DESCRIPTION OF THE DRAWINGS

FIG. 3 is a diagram showing the relation of load angle $\delta$ and output torque.

PREFERRED EMBODIMENTS OF THE INVENTION

Referring now to the accompanying drawings, preferred embodiments of a motor control apparatus and a washing machine of the invention are described below.

First Embodiment (Configuration)

Figure 1:
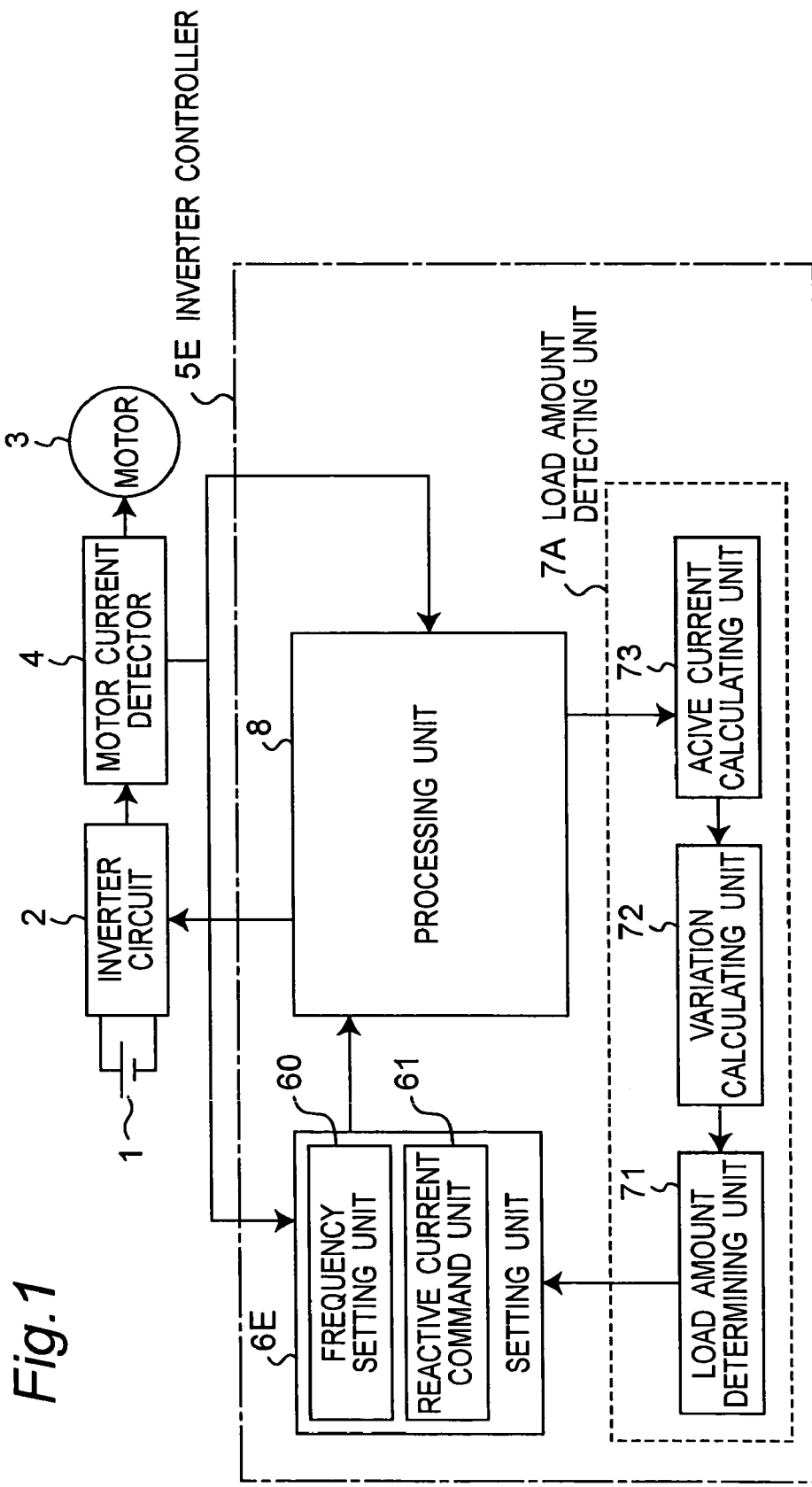
FIG. 1 is a block diagram of a motor control apparatus in the first embodiment of the invention.

The first preferred embodiment of a motor control apparatus of the invention is described. FIG. 1 is a block diagram of the motor control apparatus in the first embodiment. The motor control apparatus includes an inverter circuit 2 for converting a DC (direct-current) voltage from a DC power source 1 into an AC (alternating-current) voltage for driving a motor 3, a motor current detector 4 for detecting the current flowing in the motor 3, and an inverter controller 5E for controlling the inverter circuit 2.

The motor 3 may be, for example, a synchronous brushless motor and includes no position sensor for detecting the rotor position.

The inverter circuit 2 has six switching elements (for example, thyristor, GTO, transistor, etc.) for composing three phases of arms, and diodes connected in parallel to the switching elements. The inverter circuit 2 takes in DC power from the DC power source 1, and converts the power into AC power in response to the control signal (PWM signal) from the inverter controller 5E to supply the converted AC power into the brushless motor 3 by way of the motor current detector 4.

The motor current detector 4 may be realized, for example, by a DC current sensor capable of detecting a DC current or an AC current, or an inexpensive AC current sensor as compared with the DC current sensor. For detection of current, a shunt detection system may be employed by coupling resistance elements in series to each of switching elements composing three phases of arms of the inverter circuit 2, and calculating the detection value from the current flowing in the three phases of arms. The shunt detection system enables the current detector to be at lower cost than using the alternating-current current sensor.

The inverter controller 5E includes a setting unit 6E for setting various set values for driving the motor, a processing unit 8 for outputting a control signal to the inverter circuit 2, and a load amount detecting unit 7A for detecting amount (magnitude) of the load. The load amount detecting unit 7A includes an active current calculating unit 73 for calculating an active current component of the motor current (hereinafter refer to as just "active current") on the basis of the signal from the motor current detector 4, a variation calculating unit 72 for calculating amount of change (variation) in the output from the active current calculating unit 73, and a load amount determining unit 71 for determining the amount of load from the change amount of the active current.

The output of the motor current detector 4 is put into the processing unit 8 of the inverter controller 5E. The load amount detecting unit 7A calculates the load amount on the basis of the value calculated in the processing unit 8 to apply it to the setting unit 6E. The setting unit 6E sets various set values for controlling the inverter circuit 2. The setting unit 6E includes a frequency setting unit 60, and a reactive current command unit 61. It should be noted that control of reactive current command, phase difference φ command, phase difference α command and phase difference β command described in the present embodiment and the following embodiments is disclosed in the prior art by the present applicant (Japanese Patent Application No. 2002-048418).

(Parameters)

Figure 2A:
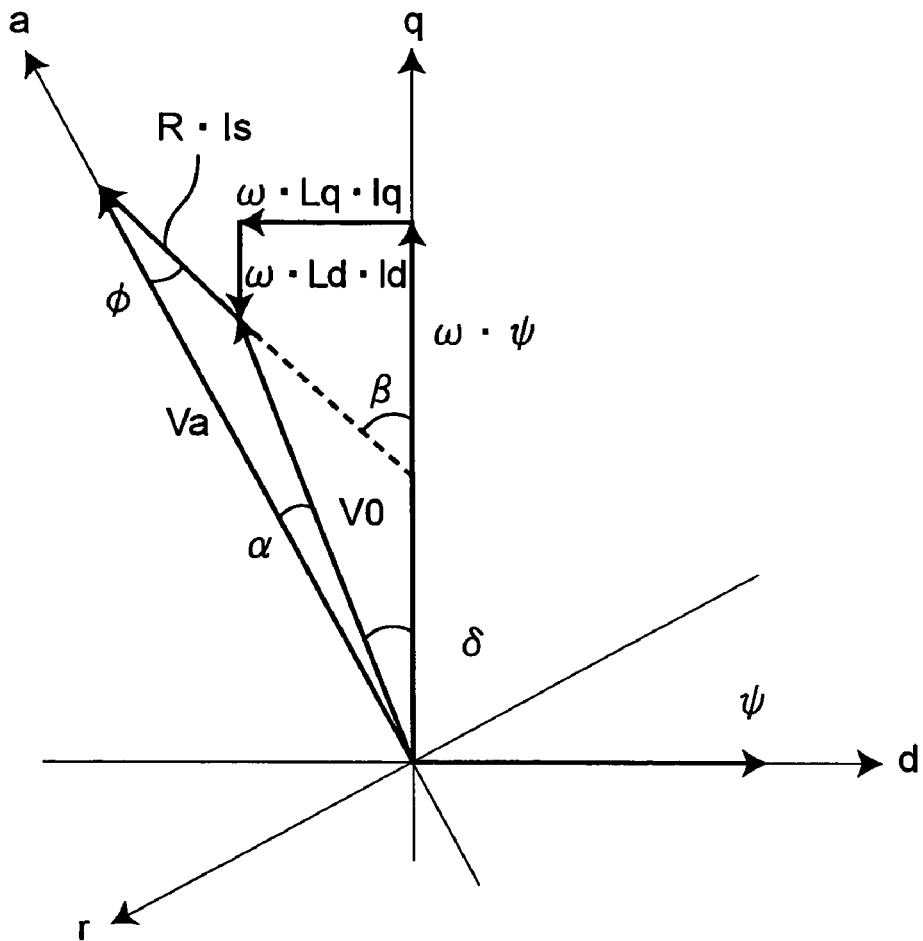
FIG. 2A is a vector diagram showing a motor applied voltage, a motor current, and their phase difference.
Figure 2B:
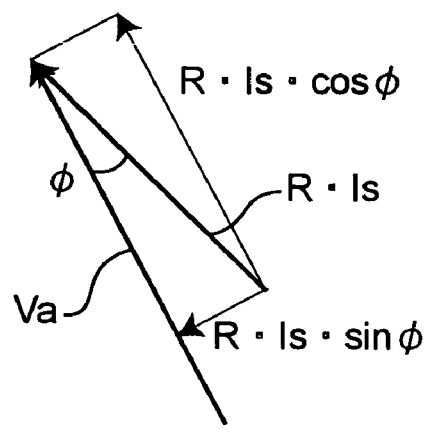
FIG. 2B is a vector diagram when the motor current is developed into active current component and reactive current component.

Parameters used in control of the motor control apparatus of the invention are defined below. FIG. 2A is a vector diagram showing the relation among motor applied voltage command value Va, induced voltage V0, and motor current Is flowing in the motor 3 as expressed on the d–q coordinates system. The voltage generated by the magnet provided in the rotor of the motor 3 is on the q-axis, and the induced voltage generated between the rotor and stator of the motor 3 including the reactance component is V0. The vector difference between the motor applied voltage command value Va and induced voltage V0 is the product of motor winding resistance R multiplied by the motor current Is. The reactive current component of motor current (hereinafter referred to as "reactive current") Ir is the component of the motor current Is in a direction orthogonal to the direction of applied voltage command value Va. The active current Ia of motor current is the component of the motor current Is in a direction of applied voltage command value Va. That is, assuming a system of coordinates plotting the a-axis in the direction of applied voltage command value Va and the r-axis in its orthogonal direction, as shown in FIG. 2B, the reactive current Ir is the r-axis direction component of the motor current Is, and the active current Ia is the a-axis direction component of the motor current Is. Herein, φ is the phase difference between the applied voltage command value Va and the motor current Is, which shows the power factor angle.

Values of reactive current Ir and active current Ia are determined in the following formulas on the basis of the current Iu, Iv, Iw of U phase, V-phase and W phase detected by the motor current detector 4.

$$Ir = \sqrt{\frac{2}{3}} \times \left\{ Iu \times \cos\theta + Iv \times \cos\left(\theta - \frac{2}{3}\pi\right) + Iw \times \cos\left(\theta - \frac{4}{3}\pi\right) \right\} \quad (1)$$

-continued $$Ia = \sqrt{\frac{2}{3}} \times \left\{ Iu \times \sin\theta + Iv \times \sin\left(\theta - \frac{2}{3}\pi\right) + Iw \times \sin\left(\theta - \frac{4}{3}\pi\right) \right\} \quad (2)$$

(Appropriate Load Angle)

In this preferred embodiment, in order to realize stable motor driving by the setting unit 6E even if load changes suddenly and significantly, the position of driving point of load angle δ in control is set at an appropriate position depending on the expected load fluctuation amount. The appropriate position of the driving point is explained below.

FIG. 3 is a diagram showing the relation between load angle δ and output torque with constant motor rotating speed and constant applied voltage to the motor. It is known from this diagram that the motor output torque increases gradually and then decreases after a peak value when the load angle δ is increased in this condition.

In general maximum torque control, the load angle δ is set so as to keep the driving point near the driving point c that provides the maximum torque. However, while operated near the driving point c, when load fluctuates suddenly and increases greatly, the torque is insufficient and the load angle δ increases until the control system responds to this fluctuation to increase the applied voltage. That is, when load increases suddenly and largely while operating at driving point c, the load angle δ increases until the control system responds. Then the output torque decreases according to the characteristic shown in FIG. 3, and the speed drops, and thereby the load angle further increases, possibly leading to out-of-tune phenomenon when the control system possess lower speed.

On the other hand, when load fluctuates suddenly and decreases greatly, the load angle δ decreases even if the applied voltage is not decreased by response of the control system, and the output torque changes to decrease according to the characteristic shown in FIG. 3. That is, since the output torque decreases as load decreases, stable operation can be achieved.

Accordingly, in the motor control apparatus of the invention, in order to drive the motor stably against sudden and large load fluctuation, especially fluctuation in increase, the setting unit 6E does not set the load angle δ near the driving point c for realizing maximum torque control, but sets at a load angle which will not exceed the driving point c even if the load fluctuates to increase, that is, at a load angle smaller by a specified amount than the load angle δ at the driving point c.

For example, the setting unit 6E operates with the load angle δ set so that the driving point may be near driving point b in FIG. 3. In this case, if the load fluctuates to increase suddenly and largely, the load angle δ increases. Then, the driving point moves from b to c, and the torque increases due to increase of the load angle δ. Hence the torque can increase more quickly than increase by the response of the control system, resulting in the stable motor drive in spite of load fluctuations.

If a larger and sudden increase of load fluctuation is predicted, the setting unit 6E sets the load angle δ near the driving point a in FIG. 3. As a result, if the driving point is changed due to larger load fluctuation, the driving point will not change and exceed c, the motor can be driven stably.

Thus, according to the invention, the setting unit 6E sets the load angle δ at an appropriate value depending on the predicted amount of load fluctuation. Hence, the motor can be driven stably in spite of sudden and large load fluctuation.

(Detection of Load Amount)

Figure 4:
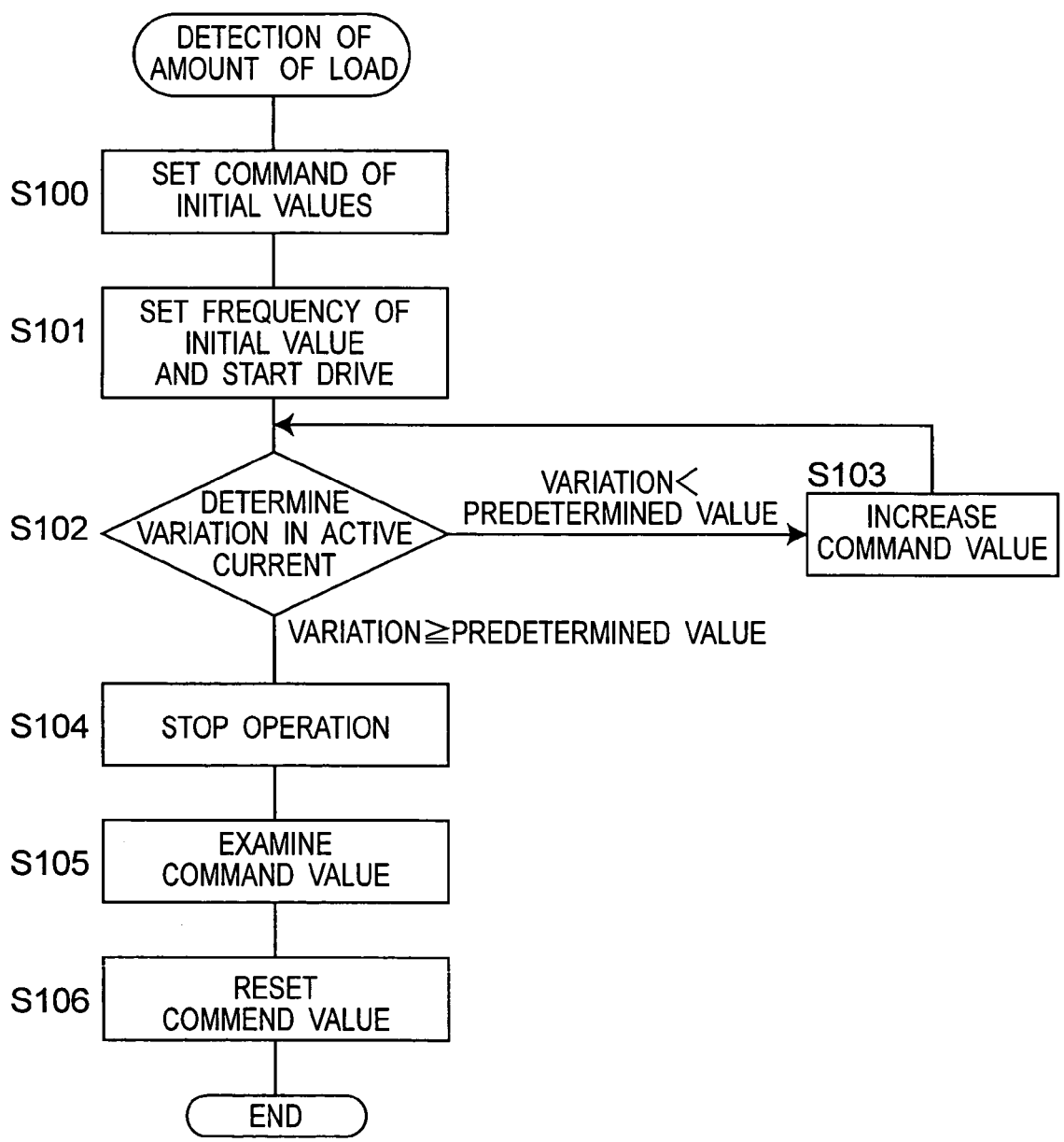
FIG. 4 is a flowchart of detecting process of load amount in the first embodiment.

To determine an appropriate load angle δ, the load amount must be estimated, and in this preferred embodiment, upon start of motor driving, the load amount is detected by the load amount detecting unit 7A. The load amount detection operation by the load amount detecting unit 7A is explained below while referring to the flowchart in FIG. 4.

Upon start of motor driving, on the setting unit 6E an initial value of the command value is set (step S100). The command value is a control target value for controlling the reactive current, and depending on this value the PWM signal to the inverter circuit 2 is created. In the frequency setting unit 60 of the setting unit 6E, an initial value of frequency is set, and driving is started at values of parameters set (step S101).

Then, the active current calculating unit 73 determines the active current from the detection signal of the motor current detector 4 according to formula (2), and amount of active current change is determined by the variation calculating unit 72. The load amount determining unit 71 compares the determined change amount with a predetermined value to judge if the determined change amount is more than the predetermined value (S102). The predetermined value may be determined, for example, by experiment. The amount of active current change is compared with the predetermined value in order to detect whether the load angle changing due to increase of reactive current command value has reached the driving point c (FIG. 3).

The load angle δ changes depending on increase of the reactive current command value. As the load angle δ changes from driving point b to c and to d as shown in FIG. 3, just after the load angle reaches the driving point c for giving the maximum output torque, sudden increase of active current is observed. Accordingly, by detecting the change amount (change rate) of the active currents between the previous control cycle and the present control cycle, it can be known that the load angle has exceeded the load angle δp for providing the driving point c (that is, reaching the driving point c), when the change amount is larger than the predetermined value.

Returning to FIG. 4, when the change amount is less than the predetermined value, the setting unit 6E sets a new command value obtained by increasing the present command value (S103), and the process returns to step S102. The loop of steps S102 and S103 increases reactive current command value gradually until the change amount of active current reaches or exceeds the predetermined value. When the change amount reaches or exceeds the predetermined value, the running motor is stopped (S104).

Then, the load amount is detected on the basis of the present command value (S105). The reason why the load amount can be detected on the basis of reactive current command value is described later. Finally, the reactive current command value is set again on the basis of the detected load amount, and output to the reactive current command unit 61 (S106), and the operation of the load amount detecting unit 7A is terminated.

Thus, detection of the sudden increase of the load angle δ caused by gradual increase of reactive current provides knowledge of the amount of the load indirectly.

Figure 5:
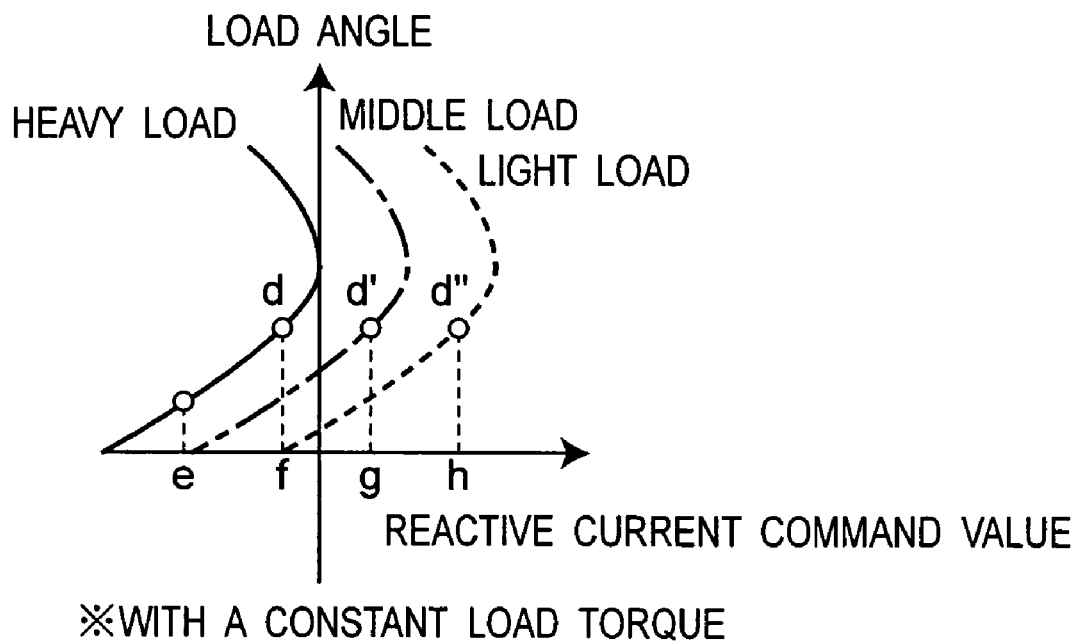
FIG. 5 is a diagram showing the relation between reactive current command value and load angle.

At the step S105, the reason why the load amount can be judged on the basis of the reactive current command value is explained. FIG. 5 is a diagram showing the relation between reactive current command value and load angle δ with the constant motor rotating speed (load torque), showing the relation between reactive current command value and load angle δ in three types of load amount, heavy, medium and light.

It is known from this figure that the relation between load angle and reactive current command value varies depending on the load amount. That is, the driving point with the load angle δ varying changes according to the amount of load, and, for example, if the load angle (corresponding to driving point c) for applying the maximum output torque in FIG. 3 can be detected, the load amount can be known indirectly from the reactive current command value at this time. This principle is specifically described below.

In FIG. 5, driving is started at reactive current command value of "e", and then the reactive current command is gradually increased. When it is detected that the load angle δ determined at step S102 in FIG. 4 reaches the load angle δp for giving the driving point c in FIG. 3, if the reactive current command value at this time is "f", the load amount is judged to be "heavy" as shown in FIG. 5. When it is detected that the load angle δ reaches the load angle δp for giving the driving point c by increasing the reactive current command value gradually from e, if the reactive current command value at this time is "g", the load amount is judged to be "medium". Similarly, when it is detected that the load angle δ reaches the load angle δp (driving point d") by increasing the reactive current command value until it reaches "h", the load amount is judged to be light. Thus load amount can be detected indirectly from the reactive current command value.

In the setting unit 6E, by setting the reactive current command value to a value smaller than the reactive current command value obtained in this manner, for the load different in load amount, the driving point can be set at a load angle δ smaller than the load angle δp for giving the driving point c in FIG. 3.

(Load Amount Detection with Phase Difference φ, Phase Difference α, or Phase Difference β)

Figure 6:
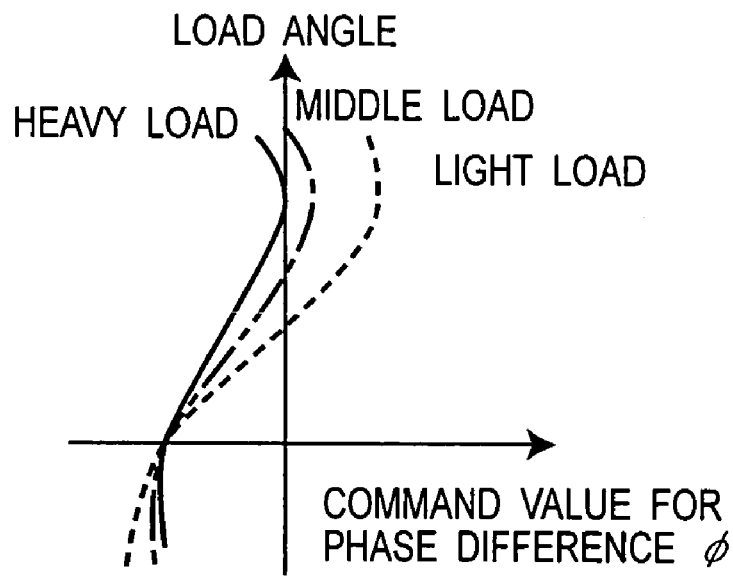
FIG. 6 is a diagram showing the relation between command value for phase difference $\phi$ and load angle.
Figure 7:
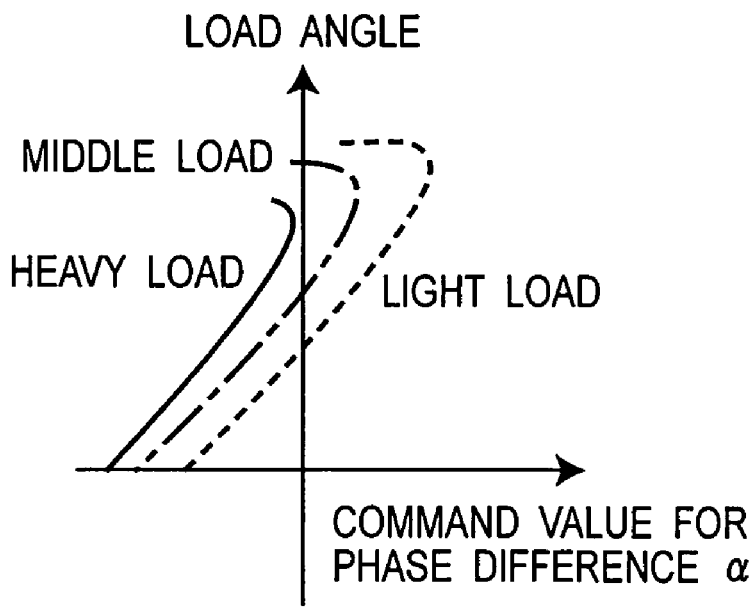
FIG. 7 is a diagram showing the relation between command value for phase difference $\alpha$ and load angle.
Figure 8:
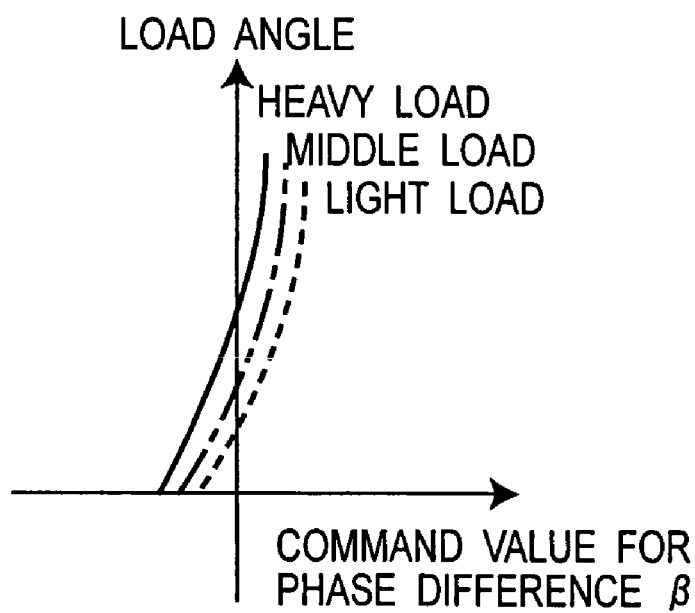
FIG. 8 is a diagram showing the relation between command value for phase difference $\beta$ and load angle.

FIG. 6, FIG. 7, and FIG. 8 are the diagrams showing the relation between the phase difference φ, phase difference a or phase difference β and the load angle, with the rotating speed kept at constant, in heavy, medium and light loads, respectively. The phase difference φ is difference in phase between applied voltage command value Va and motor current Is, the phase difference α is the phase difference between applied voltage command value Va and induced voltage V0, and the phase difference β is the phase difference between motor current Is and generated voltage ωψ by rotor magnet.

As shown in FIG. 6, FIG. 7, and FIG. 8, in the relation between phase difference φ, phase difference α or phase difference β and the load amount, the characteristic varies with the load amount similarly to the relation between reactive current and load angle. Hence, in the inverter controller, the same function as the control on the reactive current command value may be applied on any one of phase difference φ command, phase difference α command, and phase difference β command. This is because by gradually increasing any one of phase difference φ command, phase difference α command, and phase difference β command, the amount of the load can be known indirectly when a sudden and large increase of load angle δ can be detected.

Figure 9:
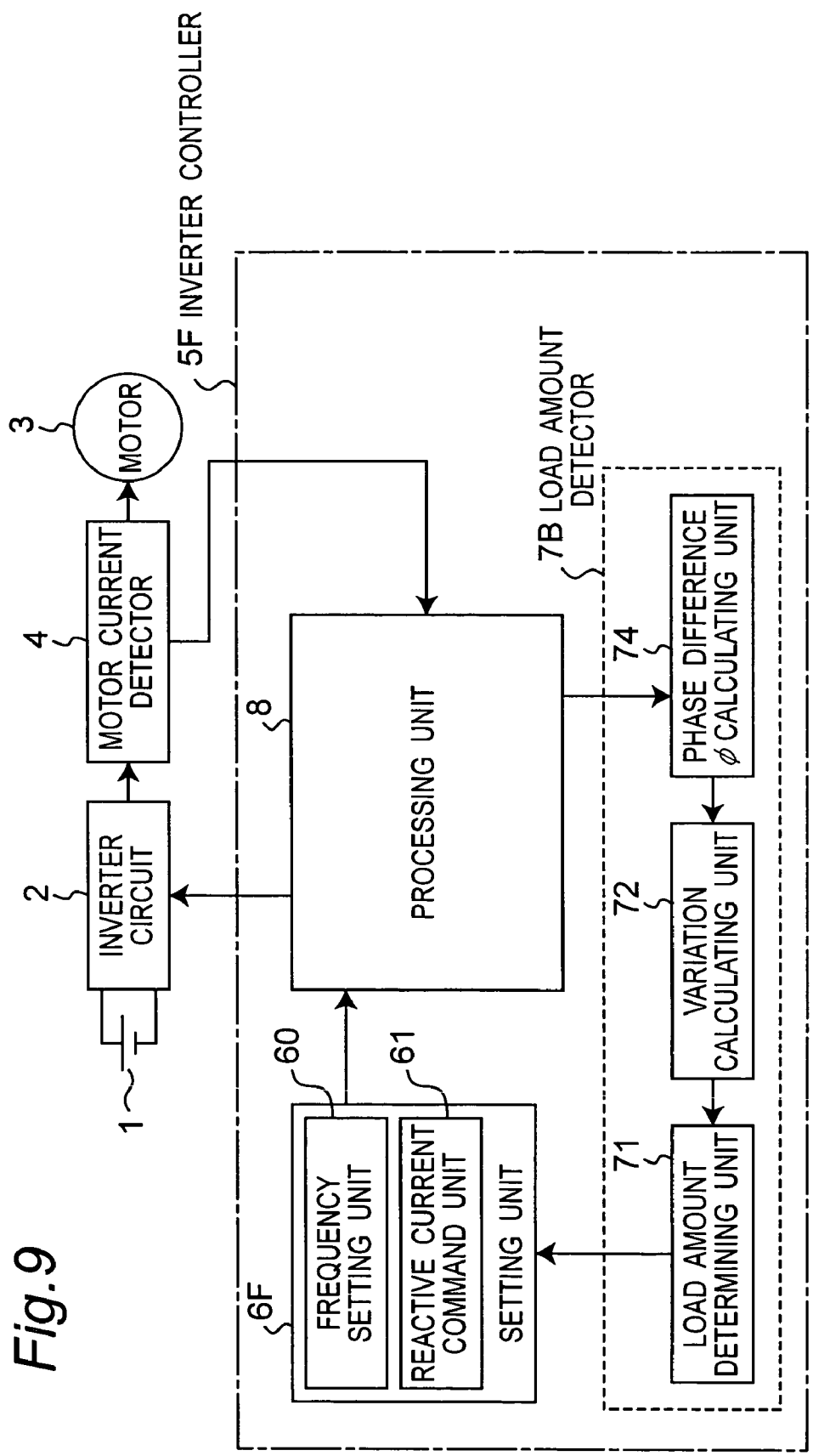
FIG. 9 is a block diagram of the motor control apparatus having a load amount detecting unit for detecting load amount by using phase difference $\phi$.
Figure 10:
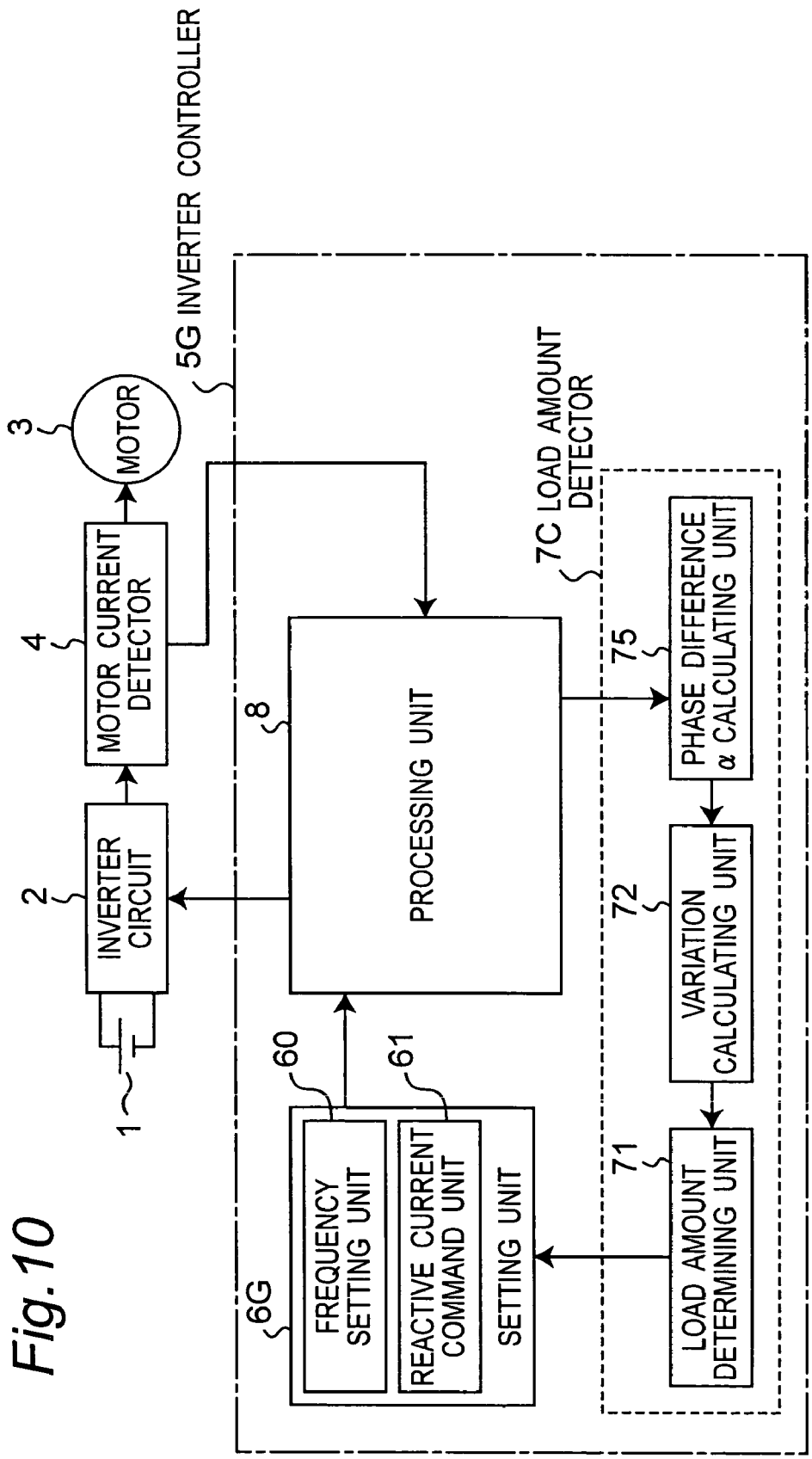
FIG. 10 is a block diagram of the motor control apparatus having a load amount detecting unit for detecting load amount by using phase difference $\alpha$.
Figure 11:
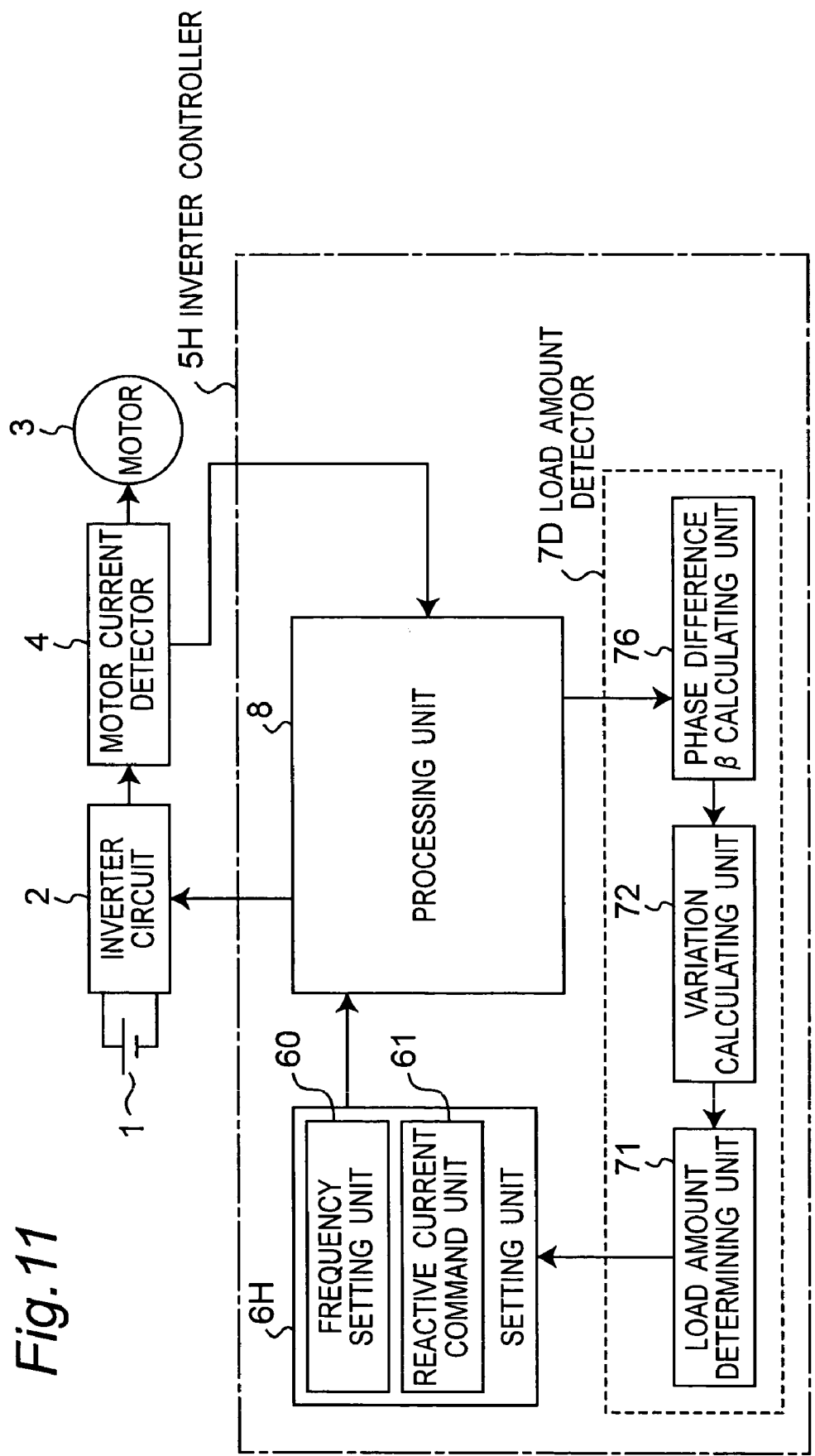
FIG. 11 is a block diagram of the motor control apparatus having a load amount detecting unit for detecting load amount by using phase difference $\beta$.

Instead of detecting the change amount of active current in the load amount detecting unit 7A, the change amount of any one of phase difference φ, phase difference α, and phase difference β may be detected. In this case, the same effects can be obtained. FIG. 9, FIG. 10, and FIG. 11 show the configuration of the load amount detecting units 7B, 7C and 7D for detecting the load amount by detecting phase difference φ, phase difference α, and phase difference β, respectively.

The motor control apparatus of the invention can detect amount of load indirectly with the reactive current as described above. When the active current or phase difference a is detected in the load amount detecting unit for detecting load amount, as shown in formula (2) and formula (3) as described later, those can be detected without using motor parameters such as inductance of motor, resistance of coil, or induced voltage. Therefore when the load amount detecting unit is configured so as to use any one of the above parameters, motor parameters are not used, and thus the motor control apparatus of the invention can be applied to motors having different parameters immediately. Further the load amount detecting unit which detects phase difference α, as shown in formula (4) described later, only resistance of motor coil is used and thus parameters can be much easily adjusted in different motors. Accordingly, a motor control apparatus with high versatility can be provided. Further the load amount detecting unit which detects phase difference β, as shown in formula (5) described later, only resistance of motor coil and inductance on q-axis are used and thus parameters can be much easily adjusted in different motors. Accordingly, a motor control apparatus with high versatility can be achieved. Especially, since an induced voltage of the motor varies with operational temperature, the motor control apparatus of the present invention without using the induced voltage of the motor has high versatility. The motor control apparatus of the invention does not perform vector control and provides small amount of operation to be processed. Thus a low-priced microcomputer can be used for the motor control apparatus.

Second Embodiment

Figure 12A:
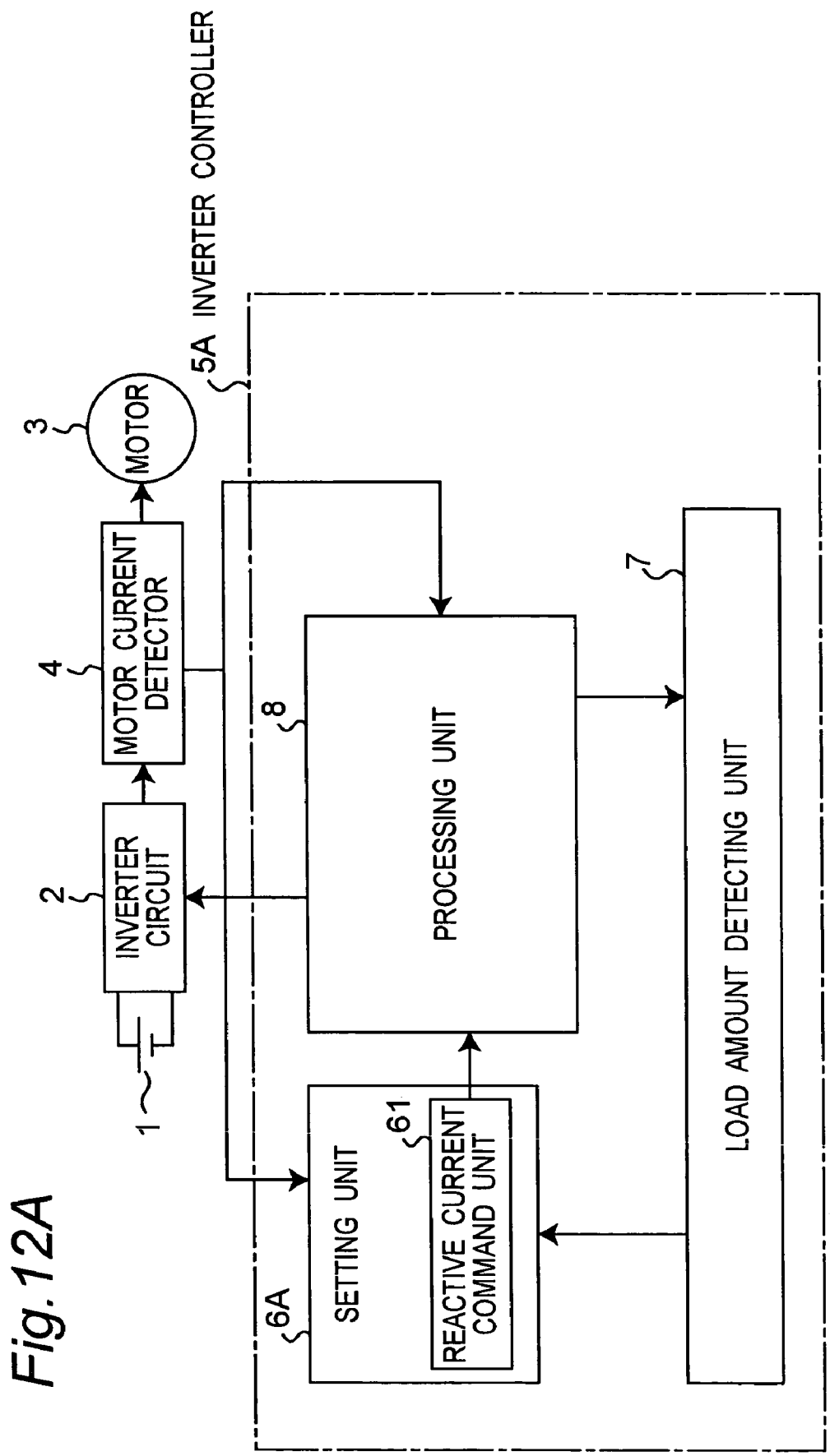
FIG. 12A is a block-diagram of the motor control apparatus in the second embodiment of the invention.

FIG. 12A is a block diagram of the motor control apparatus in the second embodiment of the invention. It should be noted that the load amount detecting unit 7 is any one of the load amount detecting units 7A to 7D described above (it is the same in the following embodiments).

Figure 12B:
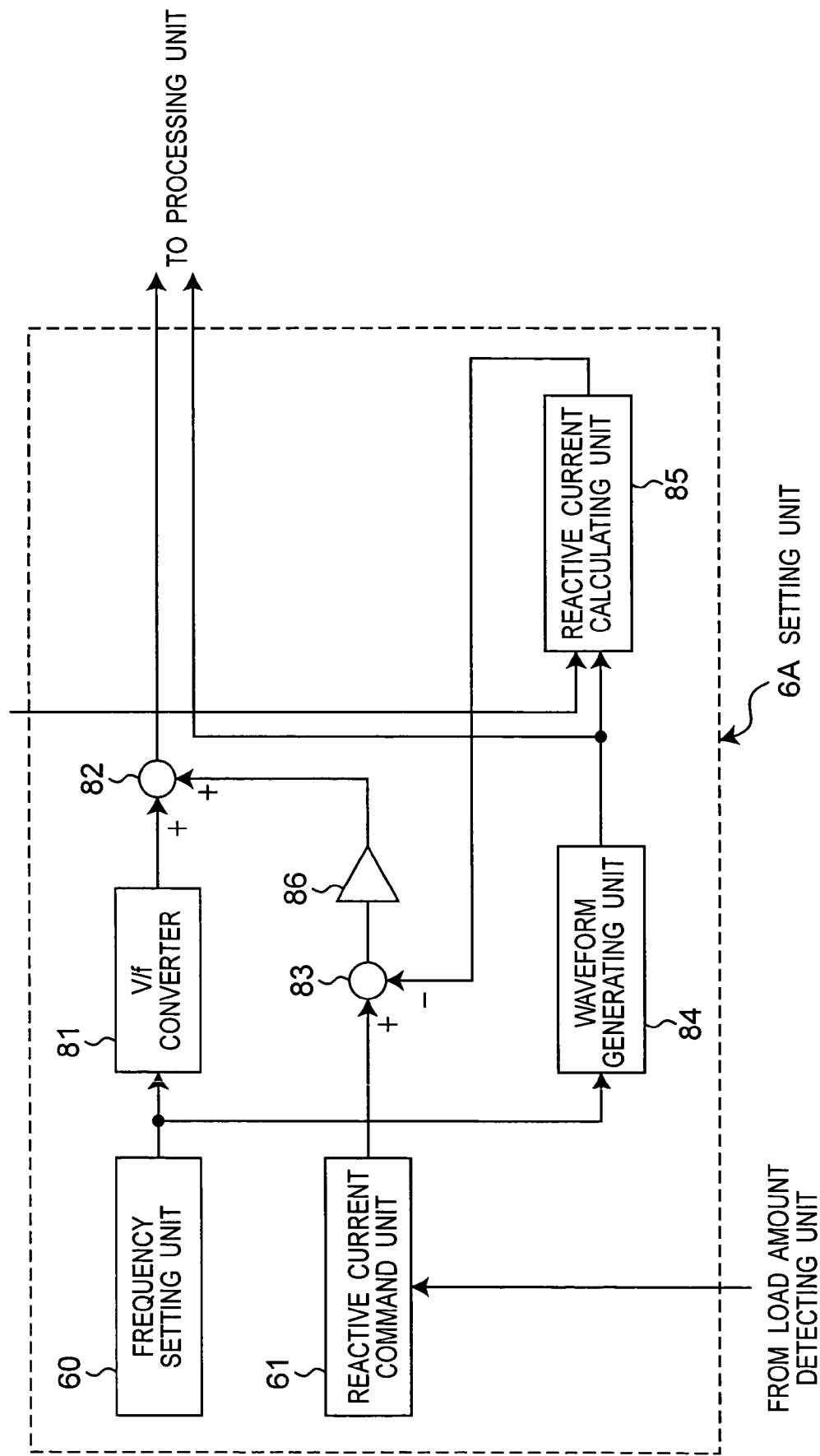
FIG. 12B is a detailed block diagram of the setting unit in the second embodiment.

FIG. 12B specifically shows the structure of the setting unit 6A. The setting unit 6A includes a frequency setting unit 60, a reactive current command unit 61, a V/f converter 81, adders 82, 83, a waveform generating unit 84, a reactive current calculating unit 85, and an error voltage output unit 86. The reactive current command unit 61 outputs a command value Ir* (hereinafter referred to as "reactive current command value") of reactive current component value Ir of motor current Is.

The frequency setting unit 60 sets command value of frequency of AC power output from the inverter circuit 2 to determine rotating speed of the motor 3. The frequency command value set is sent into the waveform generating unit 84 and V/f converter 81. The waveform generating unit 84 generates a rotation phase signal θ from the frequency command value, and applies to the reactive current calculating unit 85 and the processing unit 8. The reactive current calculating unit 85 determines the reactive current component from the outputs of the motor current detector 4 and the rotation phase signal θ of the waveform generating unit 84 using the formula (1), and feeds it into the adder 83. The adder 83 further receives the reactive current command value Ir* output from the reactive current command unit 61. The output of the adder 83 is applied to the error voltage detector 86 in which the error voltage is determined. The output of the error voltage detector 86 is added to the output of the V/f converter 81 in the adder 82, and the sum is sent to the processing unit 8. The V/f converter 81 outputs an applied voltage reference command value for driving the motor 3 to the adder 82 based on the frequency command value output from the frequency setting unit 60. Although the V/f converter generally outputs an applied voltage reference command proportional to the input frequency command value, the V/f converter 81 of the invention is not limited to that function.

Figure 13:
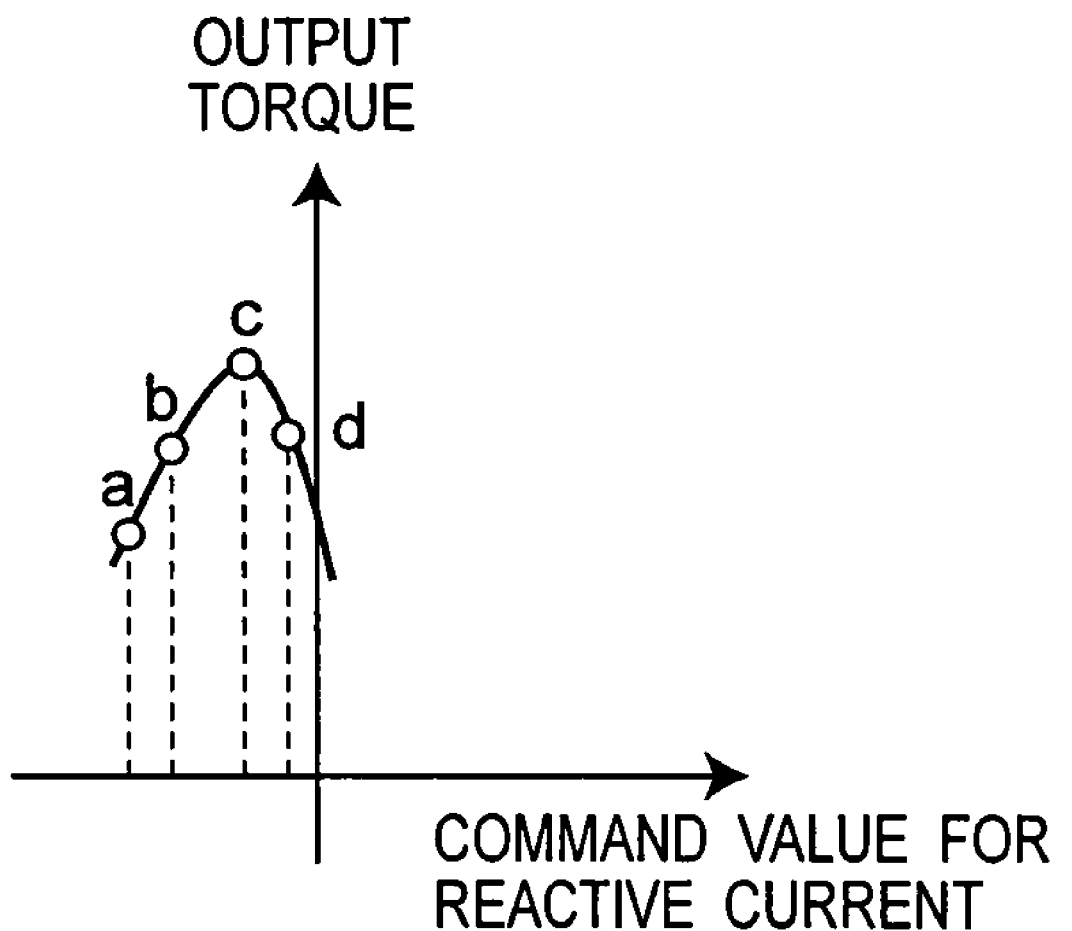
FIG. 13 is a diagram showing the relation between reactive current command value and output torque.

FIG. 13 shows the relation between reactive current command value and output torque when the motor rotating speed and applied voltage are constant. In FIG. 13, driving points a, b, c, d correspond to those in FIG. 3 respectively. It is known from this figure that the driving point can be set by using the reactive current command value.

That is, setting the reactive current command value so as to correspond to the output torque by the reactive current command unit 61 can set the driving point at a smaller load angle (appropriate load angle) than the load angle corresponding to the driving point c similarly to the first embodiment.

Therefore, changing the driving point of the inverter controller 5A depending on the amplitude of the predicted load fluctuation can achieve a motor control apparatus capable of driving stably in spite of sudden and large load fluctuation. The reactive current command value can be changed during motor driving. In a washing machine, the rotating speed may be changed in order to prevent cloths from being eccentrically-located. Since the load fluctuation changes as the rotating speed changes, the reactive current command value must be changed depending on the change of the load fluctuation. The present invention also can be applied to such a case.

In this preferred embodiment, since the driving point can be set by using the reactive current command value, it is not required to detect the load angle δ directly. It is necessary to perform calculation using motor parameters to detect load angle δ. However this embodiment can detect the load angle δ indirectly using the reactive current which can be detected without using motor parameters. Accordingly, the invention can be applied to motor control apparatuses having different motor parameters, and also motor control apparatuses which can be easily adjusted can be provided. Since the amount of data to be processed is small, a motor control apparatus can be realized by using an inexpensive microcomputer.

Third Embodiment

Figure 14:
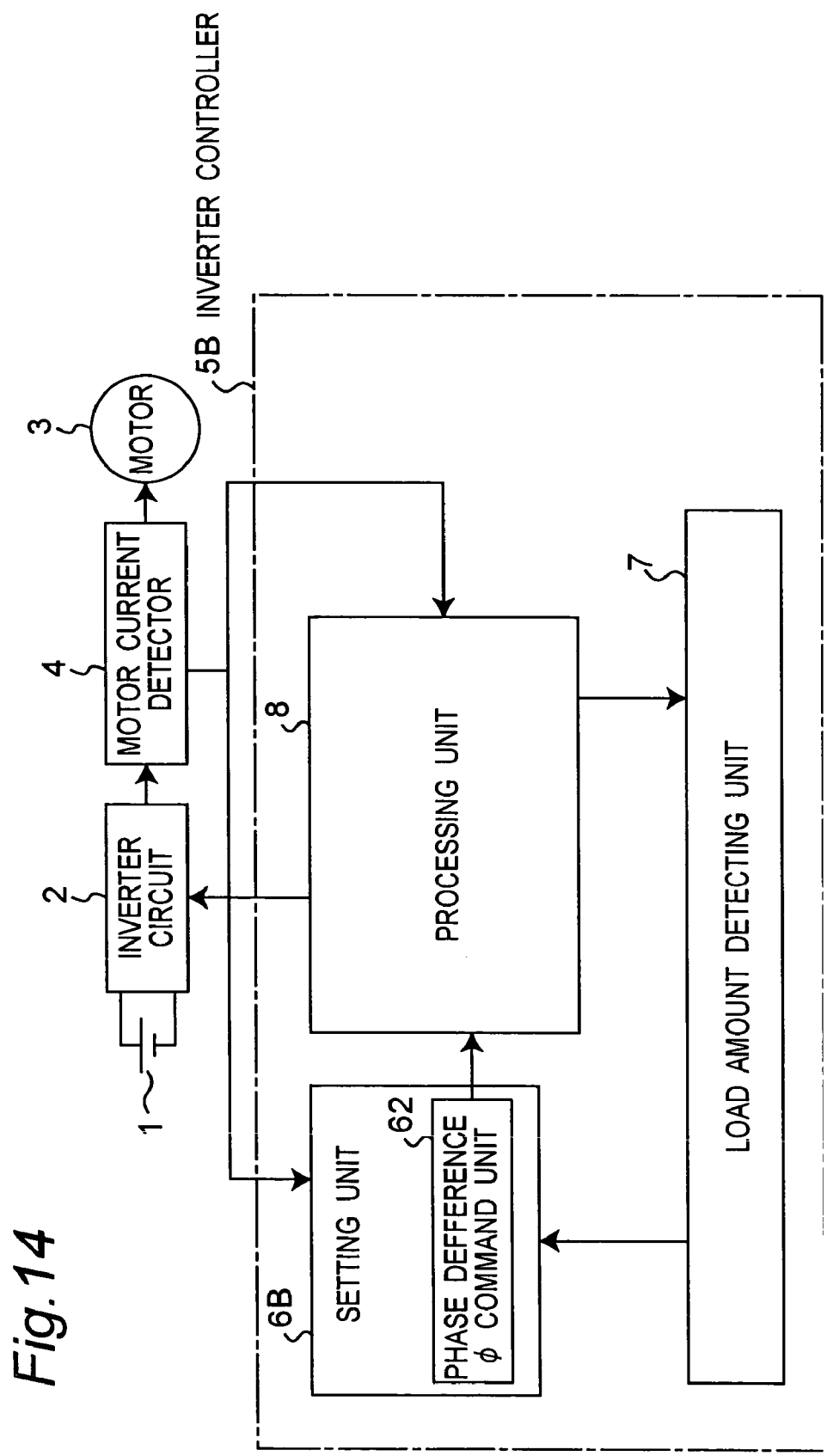
FIG. 14 is a block diagram of the motor control apparatus in the third embodiment of the invention.

FIG. 14 is a block diagram of the motor control apparatus in the third embodiment of the invention. In the figure, the motor control apparatus has a phase difference φ command unit 62 instead of the reactive current command unit 61 in the second embodiment. The other structure is the same as the second embodiment. The phase difference φ is the difference in phase between applied voltage command Va and motor current Is. The phase difference φ is determined in the following formula.

$$\phi = \tan^{-1}\left(\frac{Ir}{Ia}\right) \quad (3)$$

Figure 15:
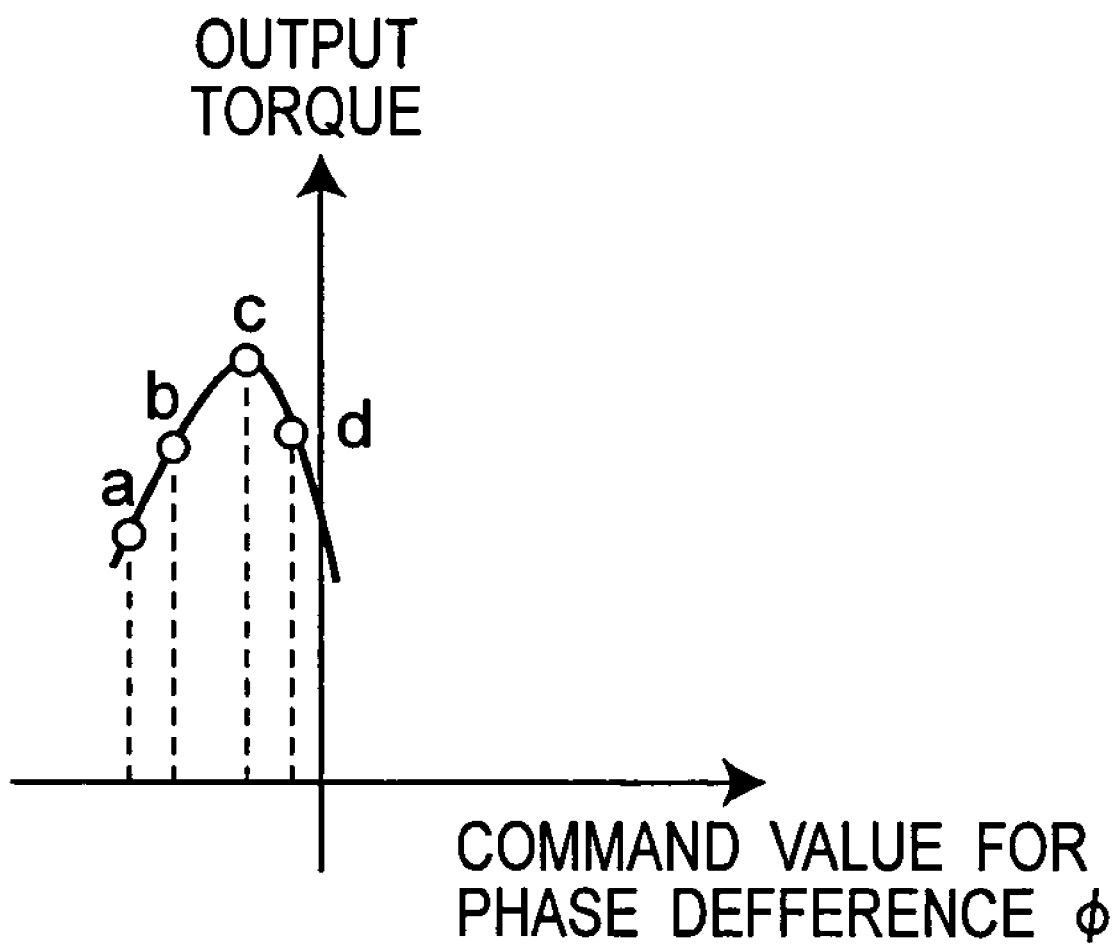
FIG. 15 is a diagram showing the relation between command value for phase difference φ and output torque.

FIG. 15 is a diagram showing the relation between phase difference φ command value and output torque when the motor rotating speed and applied voltage are constant. In FIG. 15, driving points a, b, c, d correspond to those shown in FIG. 3. It is known from this figure that the driving point can be set by using the phase difference φ command value.

That is, the phase difference φ command value is set so as to correspond to the amount of the output torque by the phase difference φ command unit 62, and thus the driving point can be set at a smaller load angle (appropriate load angle) than the load angle corresponding to the driving point c for giving the maximum efficiency as mentioned in the first embodiment.

Therefore, changing the driving point of the inverter controller 5B depending on the amplitude of the load fluctuation can provide a motor control apparatus capable of driving stably in spite of sudden and large load fluctuation. In this embodiment, since phase difference φ can be changed during motor driving as described in the second embodiment, a motor control apparatus capable of operating stably even if the load fluctuation is changed during the motor driving can be provided.

In this embodiment, too, since the driving point can be set by using the phase difference φ command value, it is not required to detect the load angle δ directly. It is seen from formulas (1) to (3) that motor parameters are not used for detecting phase difference φ. According to this embodiment, the load angle δ can be detected indirectly without using motor parameters. Hence, this embodiment can present a motor control apparatus directly applied to motors having different motor parameters.

Meanwhile, the phase difference φ indicated by angle is a power factor angle, and thus control of the phase difference φ causes the power factor of the motor, that is, the distribution ratio of the active power and reactive power to be set directly. Hence there is an effect that the motor driving state can easily be set.

Fourth Embodiment

Figure 16:
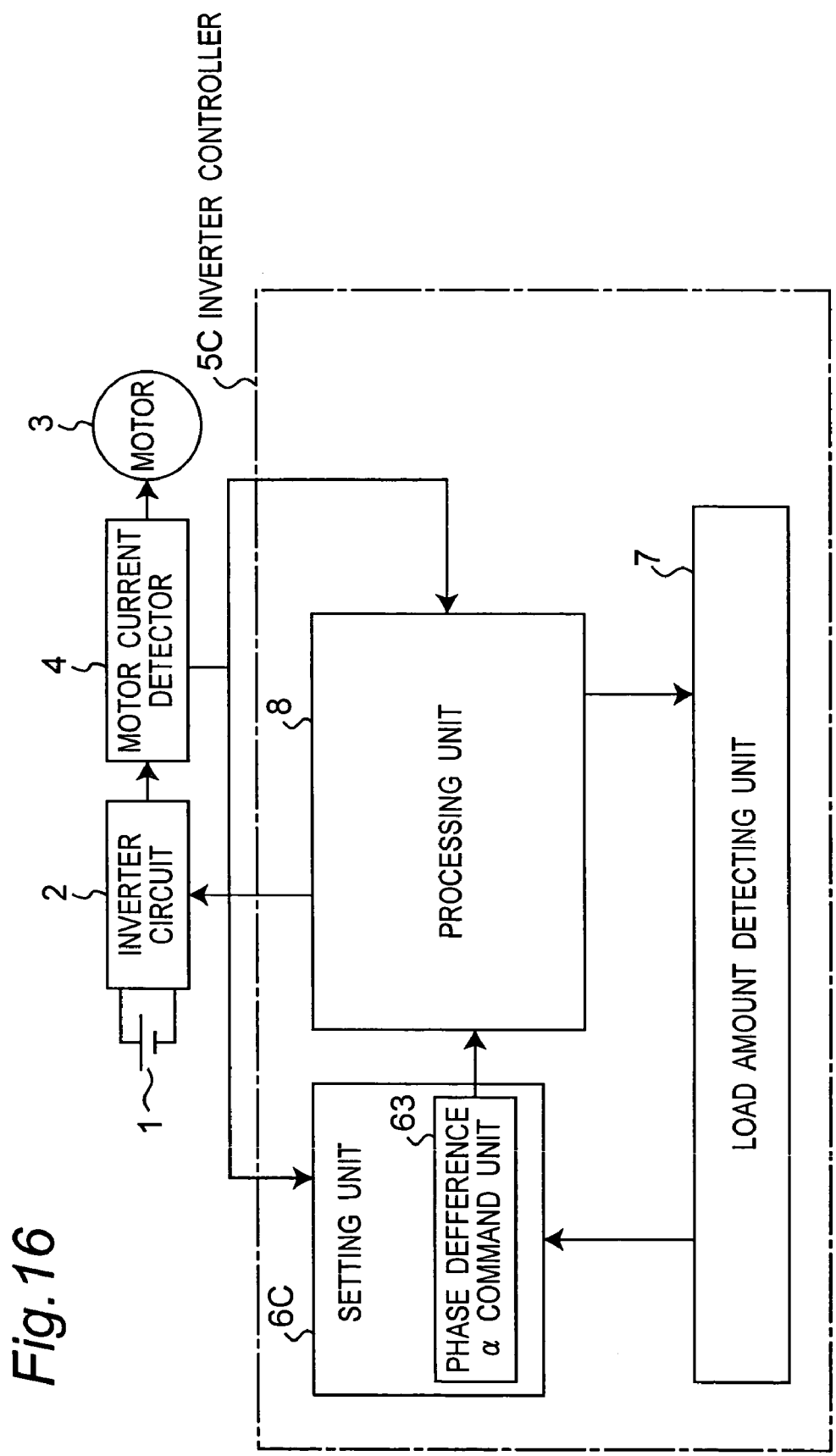
FIG. 16 is a block diagram of the motor control apparatus in the fourth embodiment of the invention.

FIG. 16 is a block diagram of motor control apparatus in the fourth preferred embodiment of the invention. In the diagram, the motor control apparatus has a phase difference α command unit 63, instead of the reactive current command unit 61 in preferred embodiment 2. The other structure is the same as preferred embodiment 2. The phase difference α is the phase difference between applied voltage command value Va and induced voltage V0. The phase difference α is determined in the following formula.

$$\alpha = \tan^{-1}\left(\frac{R \times Ir}{Va - R \times Ia}\right) \quad (4)$$

Figure 17:
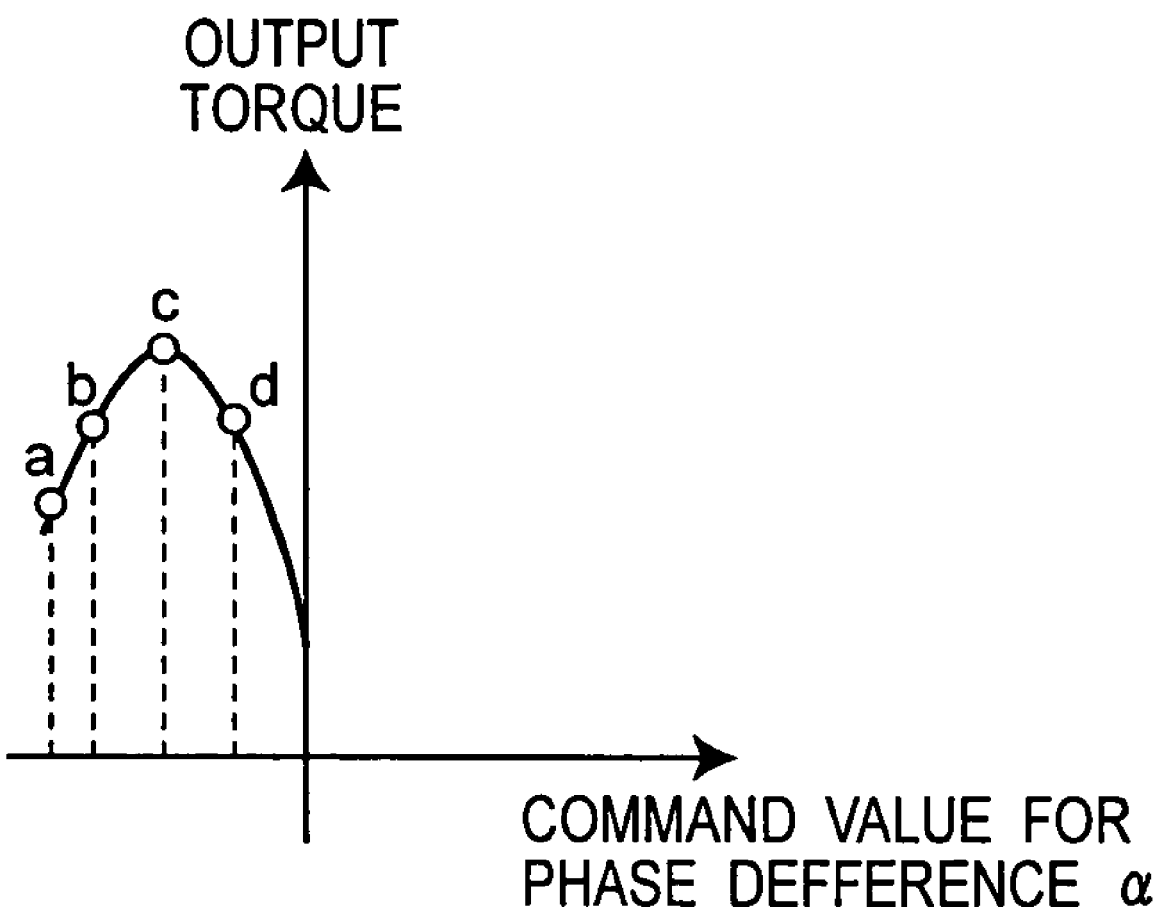
FIG. 17 is a diagram showing the relation between command value for phase difference α and output torque.

FIG. 17 is a diagram showing the relation between phase difference α command value and output torque when the motor rotating speed and applied voltage are constant. In FIG. 17, driving points a, b, c, d correspond to those in FIG. 3. It is known from this figure that the driving point can be set by using the phase difference α command value.

That is, the phase difference a command value is set so as to correspond to the amount of the output torque by the phase difference α command unit 63, and thus the driving point can be set at a smaller load angle (appropriate load angle) than the load angle corresponding to the driving point c for providing the maximum efficiency as mentioned in the first embodiment.

Therefore, changing the driving point of the inverter controller 5C depending on the amplitude of the load fluctuation can provide a motor control apparatus capable of driving stably in spite of sudden and large load fluctuation. In this embodiment, since phase difference α can be changed during motor driving as described in the second embodiment, a motor control apparatus capable of operating stably even if the load fluctuation is changed during the motor driving can be provided.

In this preferred embodiment, too, since the driving point can be set by using the phase difference α command value, it is not required to detect the load angle δ directly. According to the present embodiment, phase difference α can be detected with using resistance R of motor coil as shown in formula (4), and thus a motor control apparatus having fewer motor parameters can be provided. Hence a motor control apparatus which can be adjusted easily can be provided.

Since the rotation frequency is not stable upon start of the motor, the induced voltage ωφ (see FIG. 2A) generated by rotor magnet fluctuates significantly. Therefore, the induced voltage V0 varies largely in both magnitude and direction, and the motor current Is also changes widely. As a result, when starting the motor, the phase difference φ between applied voltage command value Va and motor current Is varies largely, and the detection value of phase difference φ fluctuates, and it is hard to control. By contrast, in such case, the phase difference a changes only slightly, and the detection value of phase difference a does not fluctuate upon start of motor. Therefore, use of the phase difference a as in this embodiment causes advantages in that stable feedback control is provided and motor control becomes easier from the motor starting time.

Detection of phase difference α requires only the wiring resistance R of motor, but does not require inductance value which varies significantly depending on the load. Therefore correction by load is not necessary so that an inexpensive motor control apparatus can be realized.

Fifth Embodiment

Figure 18:
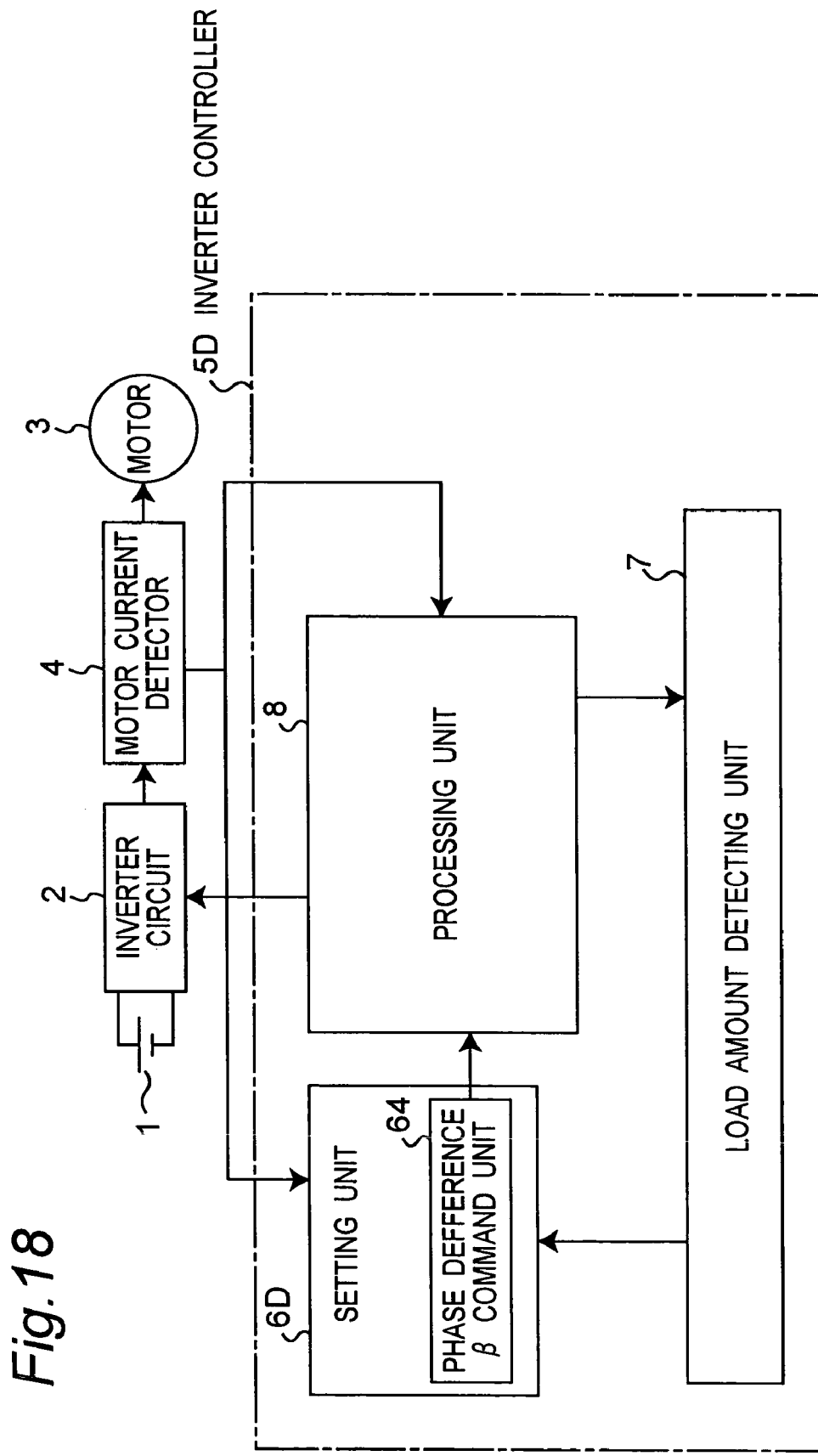
FIG. 18 is a block diagram of the motor control apparatus in the fifth embodiment of the invention.

FIG. 18 is a block diagram of the motor control apparatus in the fifth embodiment of the invention. In the figure, the motor control apparatus has a phase difference β command unit 64 instead of the reactive current command unit 61 in the second embodiment. The other structure is the same as the second embodiment. The phase difference β is difference in phase between q-axis as a rotor shaft shown in FIG. 2A and motor current Is. The phase difference β is determined in the following formula.

$$\beta = \tan^{-1}\left(\frac{Va \times Ir - \omega \times Lq \times Is^2}{Va \times Ia - R \times Is^2}\right) \quad (5)$$

Figure 19:
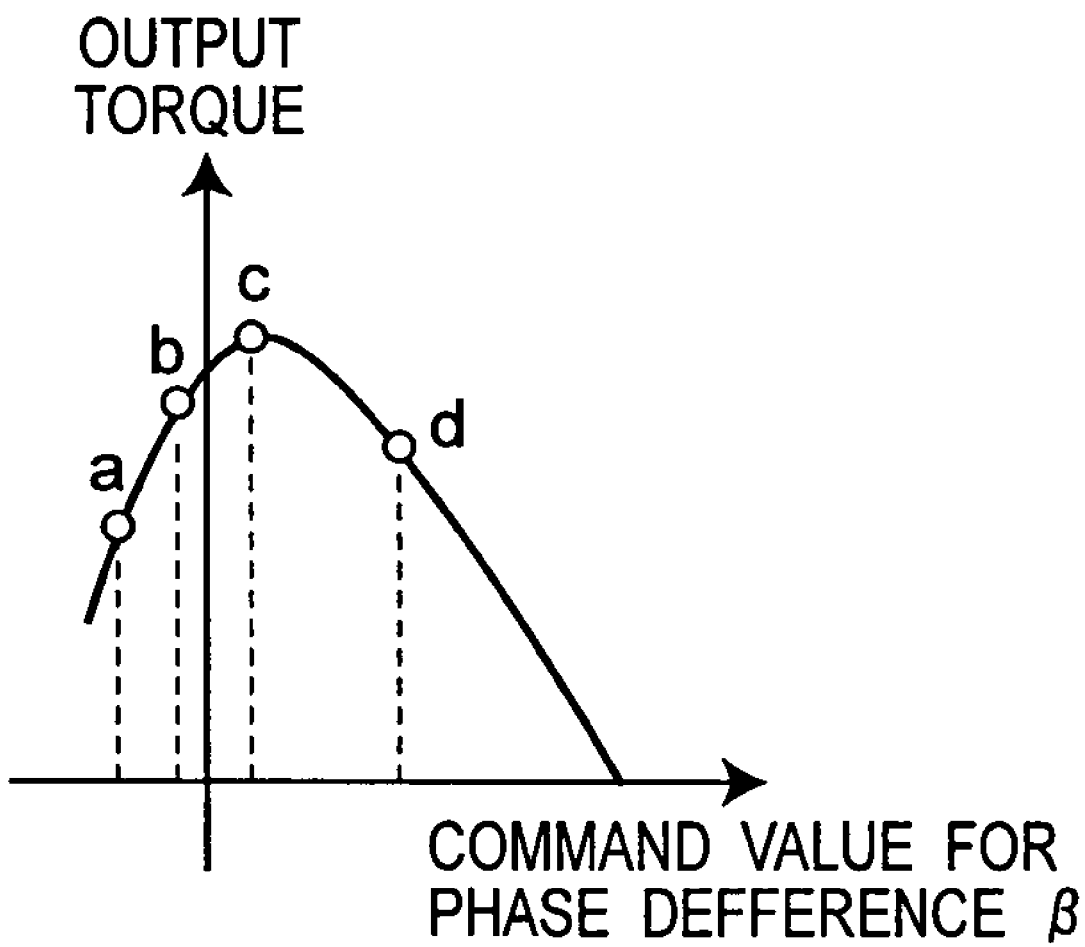
FIG. 19 is a diagram showing the relation between command value for phase difference β and output torque.

FIG. 19 is a diagram showing the relation between phase difference β command value and output torque when the motor rotating speed and applied voltage are constant. Driving points a, b, c, d in FIG. 19 correspond to those in FIG. 3. It is known from this figure that the driving point can be set by using the phase difference β command value.

That is, the phase difference β command value is set so as to correspond to magnitude of the output torque by the phase difference β command unit 64, and thus the driving point can be set at a smaller load angle δ than the driving point c mentioned in the first embodiment.

Therefore, by changing the driving point of the inverter controller 5D depending on the amplitude of the load fluctuation, a motor control apparatus capable of driving stably in spite of sudden and large load fluctuation can be realized. In this embodiment, since phase difference β can be changed during motor driving as described in the second embodiment, a motor control apparatus capable of operating stably even if the load fluctuation is changed during the motor driving can be provided.

Sixth Embodiment

Although in the first embodiment, the load amount is detected when starting motor driving, in this embodiment, it is also detected during motor driving. The other structure is the same as the first embodiment.

Figure 20:
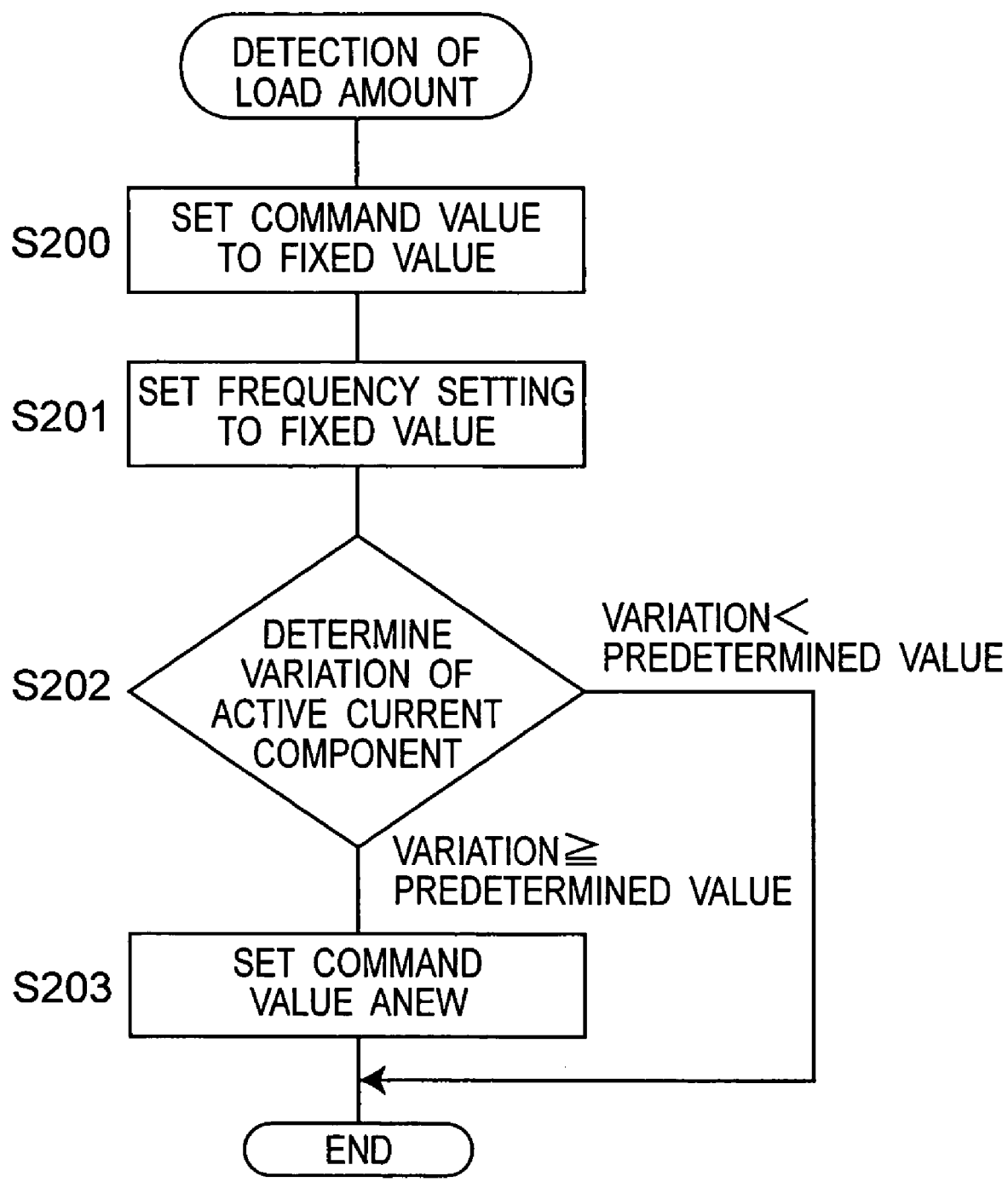
FIG. 20 is a flowchart of detecting process of load amount in the sixth embodiment.

The load amount detecting method during motor driving in this embodiment is explained below by referring to the flowchart in FIG. 20. The present embodiment is effective especially to the case that it is not known how the load amount changes during motor driving.

The load amount detecting unit 7A detects the load again after a predetermined time after start of motor driving. At the beginning, the present command value is set as a fixed value by the setting unit 6E (step S200). Next, the frequency setting unit 60 sets the present frequency setting as a fixed value (step S201). The variation (change amount) of the active current obtained on the basis of the detection signal of the motor current detector 4 is compared with a predetermined value (step S202). When the variation is smaller than the predetermined value, it is judged that the load amount is unchanged, and load detection is terminated. On the other hand, if the variation is larger than the predetermined value, the setting unit 6E sets the command value again on the basis of the detected variation (step S203), and the processing is terminated. The predetermined value may be obtained by experiment.

In this operation, if the load amount changes after start of motor driving, the load amount is detected, and the set value can be set again depending on the load amount, and occurrence of out-of-tune phenomenon due to load fluctuation can be prevented in advance, and a washing machine capable of driving the motor stably can be realized.

Seventh Embodiment

Figure 21:
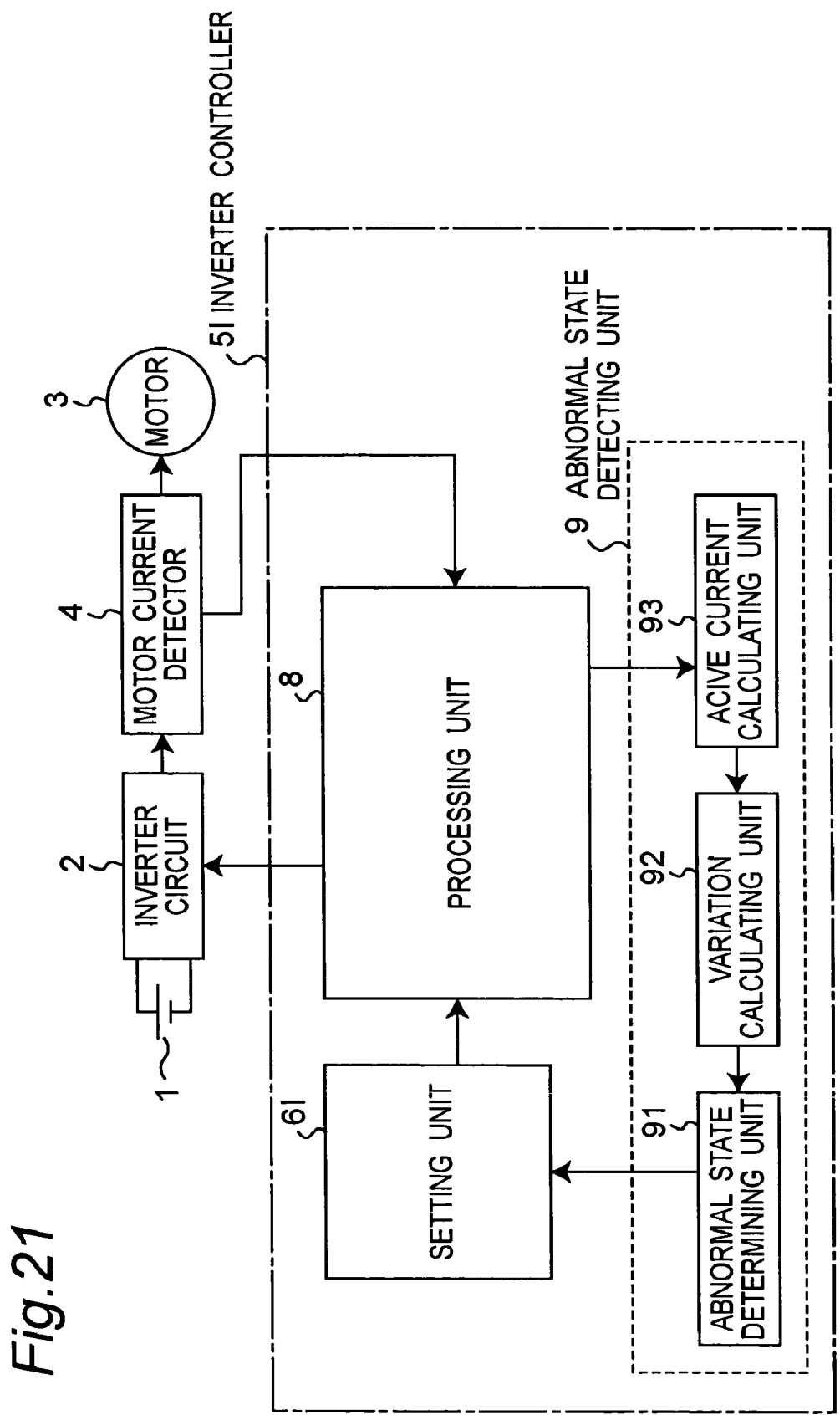
FIG. 21 is a block diagram of the motor control apparatus in the seventh embodiment of the invention.

FIG. 21 is a block diagram of the motor control apparatus in the seventh embodiment of the invention. In the figure, the inverter controller 51 includes a setting unit 61, a processing unit 8, and an abnormal state detecting unit 9. The other structure is the same as the first embodiment.

The abnormal state detecting unit 9 detects abnormality of motor running state on the basis of the signal from the motor current detector 4. It includes an active current calculating unit 93 for calculating the active current component from the detected motor current, a variation calculating unit 92 for calculating the change amount from the previous cycle of the output (active current) from the active current calculating unit 93, and an abnormal state determining unit 91 for determining load abnormality from the change amount of active current.

Figure 22:
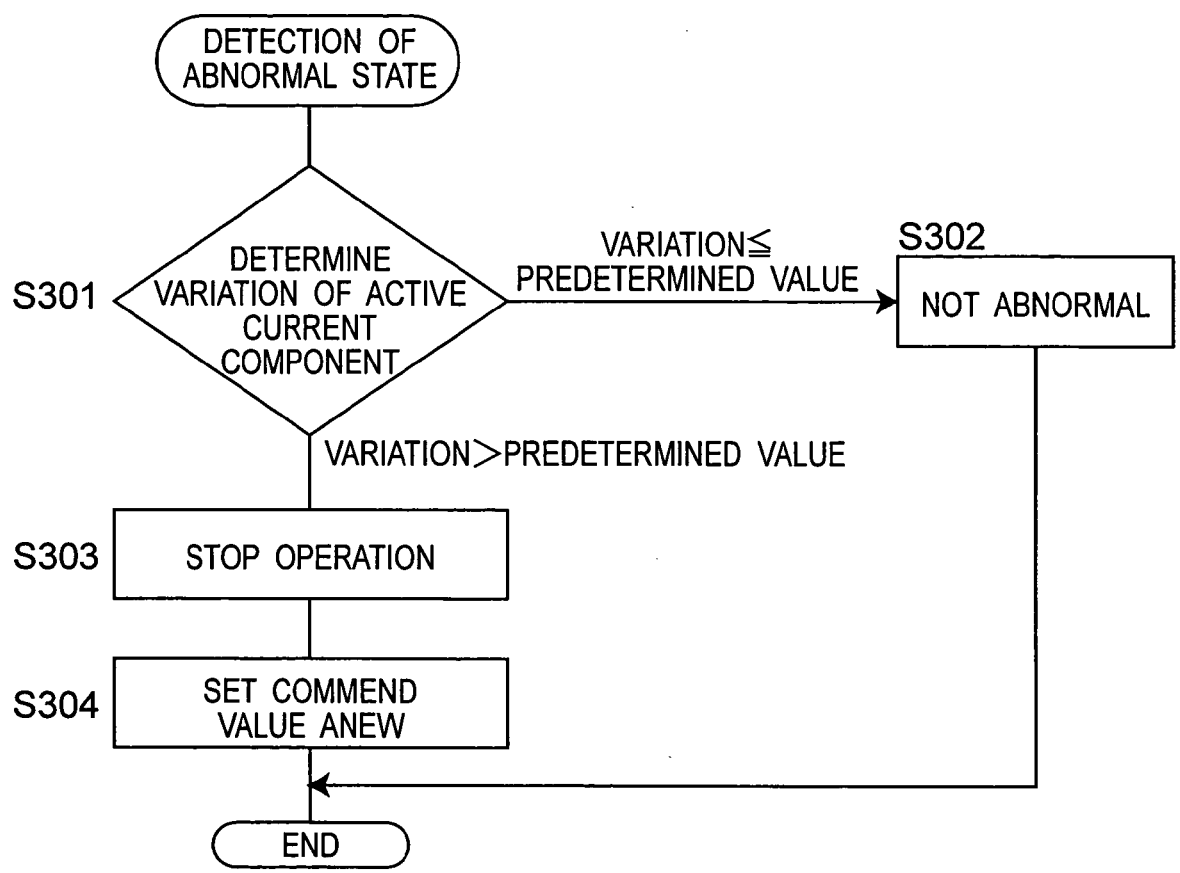
FIG. 22 is a flowchart of abnormality detecting process in the seventh embodiment.

Abnormality detection operation of the inverter controller 51 is explained by referring to the flowchart in FIG. 22.

The abnormal state detecting unit 9 detects abnormality after a predetermined time after start of motor driving. At the beginning, the change amount of the active current on the basis of the detection signal from the motor current detector 4 is compared with a predetermined value, and the change amount is judged to be smaller than or equal to the predetermined value or not (step S301). The predetermined value may be determined by experiment. When the change amount is smaller than the predetermined value, the load is judged to be free from abnormality (step S302), and the abnormality detection is terminated.

If the change amount is larger than the specified value, on the other hand, the load is judged to be abnormal, and the setting unit 6E sets the set value so as to stop motor driving (step S303). Then, the command value is set again to an appropriate value (step S304). For setting the command value again, for example, at least one of the following processes is executed.

1) The rotating speed command value is fixed (that is, to keep at specified rotating speed).

2) The rotating speed command value is decreased (that is, to decelerate).

3) The command value (reactive current command, phase difference ϕ command, phase difference a command, or phase difference β command) is set so that the driving point is positioned on the smaller side of the driving point c in FIG. 3.

After setting the set value again, the motor is started again, and abnormality detection is terminated.

It should be noted that the abnormal state detecting unit 9, instead of detecting the change amount of active current, may detect the change amount of any one of the phase difference ϕ, phase difference α, and phase difference β (not shown).

By this operation, if load abnormality such as out-of-tune occurs after start of motor driving, the abnormality can be detected without using position sensor. If abnormality is further detected, the set value can be set again depending on the load fluctuation, and the operation can be resumed after onset of out-of-tune phenomenon, and thus a motor control apparatus capable of driving the motor even in the event of unexpected load fluctuation can be realized. The present embodiment is different from the sixth embodiment in that when out-of-tune or load abnormality is detected, the motor is driven again by once stopping the motor and judging the load amount again.

Eighth Embodiment

Figure 23:
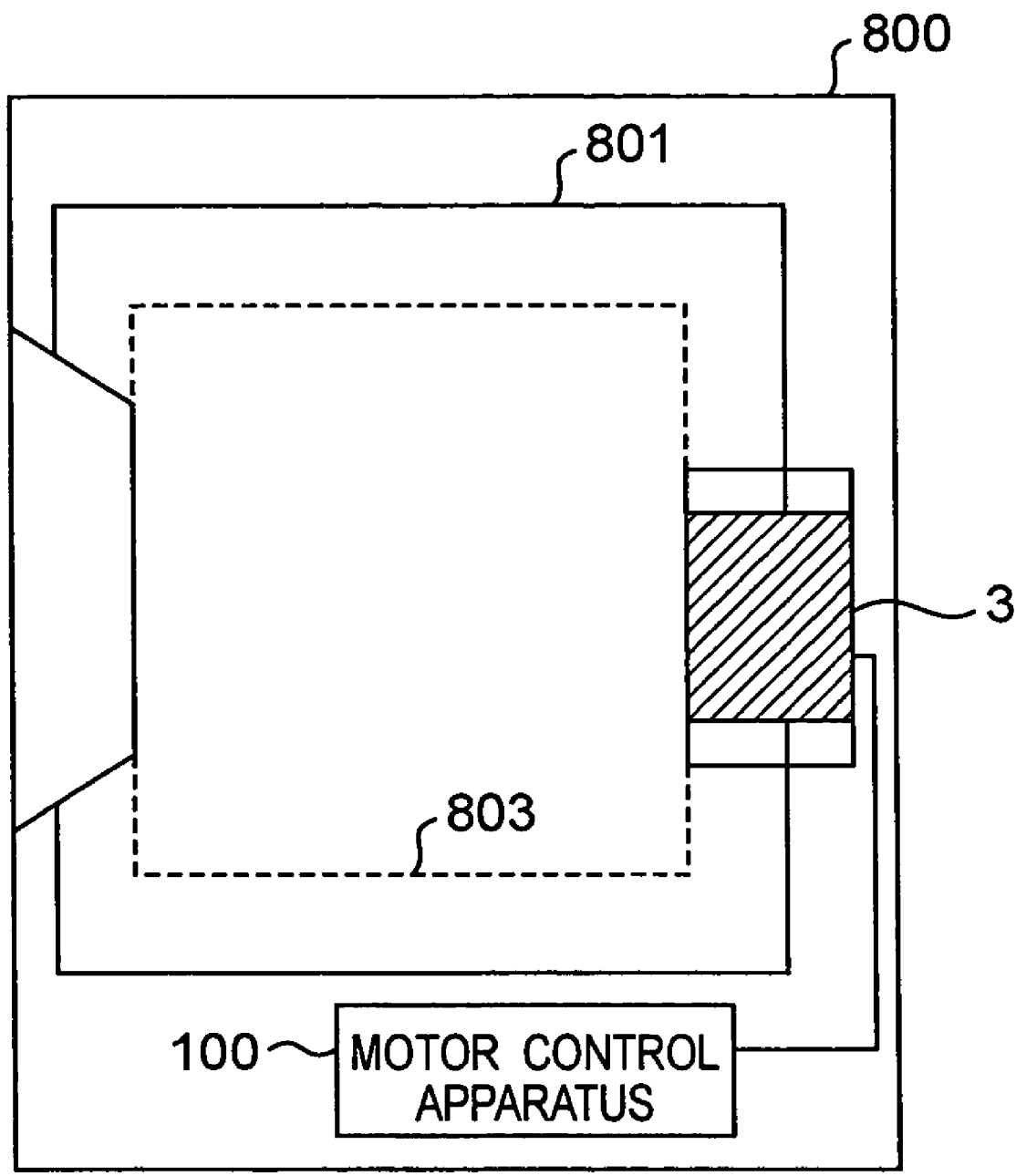
FIG. 23 is a block diagram of the washing machine of the invention.
Figure 24:
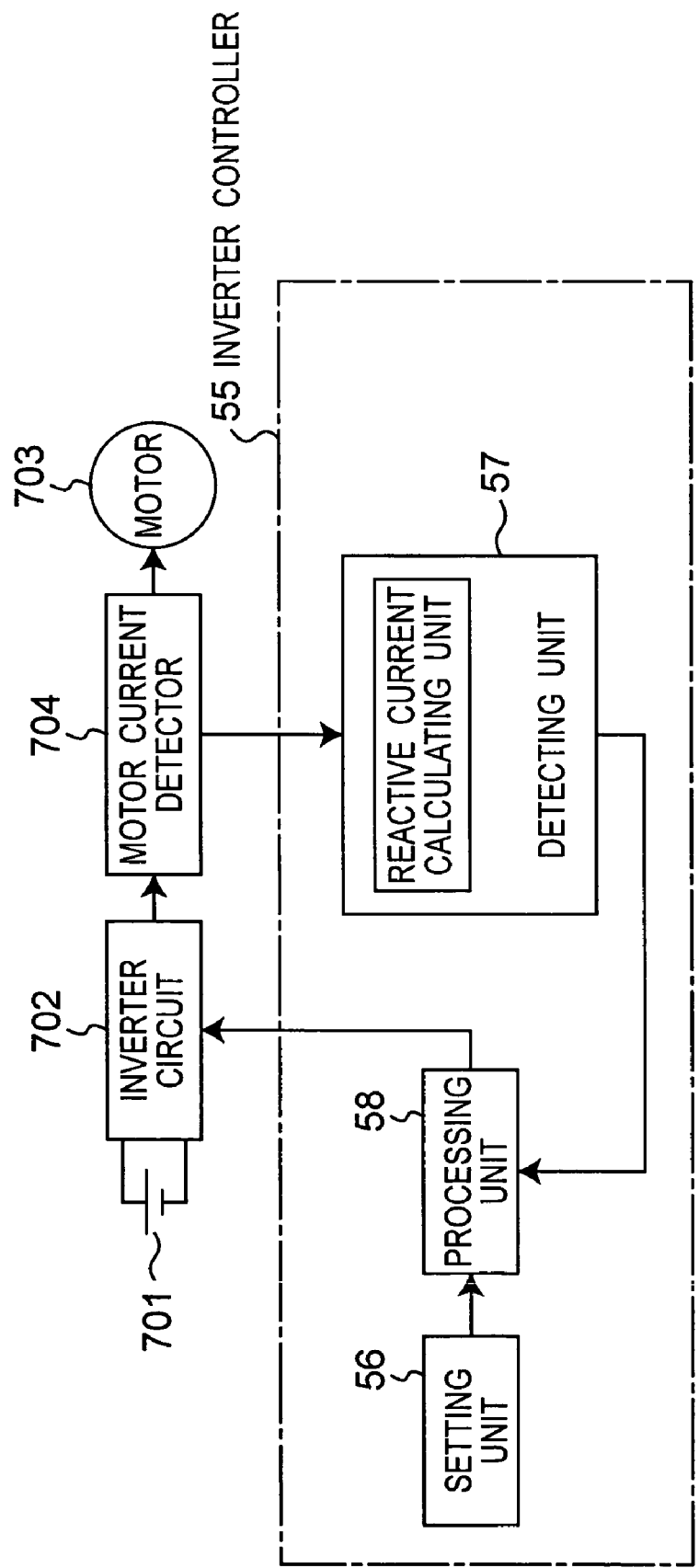
FIG. 24 is a block diagram of a conventional motor control apparatus.

FIG. 23 shows a sectional structure of a drum type washing machine using the motor control apparatus in any one of the foregoing preferred embodiments. The drum type washing machine has an outer housing 800 including a drum-shaped fixed tank 801 in which washing water is filled. A drum-shaped rotary tank 803 is provided in the fixed tank 801. The rotary shaft of the drum-shaped rotary tank 803 is coupled to a driving motor 3. The drum-shaped rotary tank 803 is rotated around the rotary shaft by the driving motor 3, and the laundry put inside can be washed. The driving motor 3 is driven by a motor control apparatus 100. The motor control apparatus 100 is a motor control apparatus in any one of the foregoing preferred embodiments.

In the washing machine of the present embodiment, since the motor is driven by the motor control apparatus, stable operation can be realized to sudden and large load fluctuations. It should be noted that the washing-drying machine is not limited to the drum type, but includes, for example, a vertical type having an opening for loading and unloading the laundry provided on the top, with the rotary shaft of the rotary tank 803 disposed in the perpendicular direction. The motor control apparatus of the invention also can be applied to a washing machine having a function of drying or a drum type drying machine.

INDUSTRIAL APPLICABILITY

The motor control apparatus of the invention is an apparatus for controlling the motor without using position sensor, and realizes a stable motor control to sudden and large load fluctuations, and hence it can be applied in a motor control apparatus accompanied by large load fluctuations during operation, and other electrical appliances such as washing machines and drying machines.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2003-278333, filed on Jul. 23, 2003, which is expressly incorporated herein by reference in its entirety.

What is claimed is:

1. A sensorless motor control apparatus comprising:
an inverter circuit that supplies driving power to a sensorless motor,
a motor current detector that detects the current flowing in the motor, and
an inverter controller that controls the inverter circuit on the basis of the output from the motor current detector, wherein
the inverter controller includes:
a setting unit that sets various command values for controlling the operation state of the motor; and
a processing unit that controls the inverter circuit so as to provide the operation state according to the setting by the setting unit; and
the setting unit sets the command value so that a load angle which is an angle between the rotor axis and motor applied voltage may be positioned on the smaller side than the load angle for providing the maximum output torque in the characteristic of load angle and output torque.

2. The sensorless motor control apparatus of claim 1, wherein the inverter controller further comprises abnormal state detecting unit that detects abnormality of the sensorless motor on the basis of change amount in motor current, and
the setting unit provides setting for predetermined process when detecting the abnormality of the sensorless motor.

3. The sensorless motor control apparatus according to claim 2, wherein the setting unit provides setting so as to stop motor operation once when abnormality is detected by the abnormal state detecting unit, and then to resume motor operation after the operation state is restored.

4. A washing machine comprising a sensorless motor, and a sensorless motor control apparatus according to claim 1 for driving the sensorless motor.

5. A drying machine comprising a sensorless motor, and a sensorless motor control apparatus according to claim 1 for driving the sensorless motor.

6. A motor control apparatus comprising:
an inverter circuit that supplies driving power to a motor,
a motor current detector that detects the current flowing in the motor, and
an inverter controller that controls the inverter circuit on the basis of the output from the motor current detector, wherein
the inverter controller includes:
a setting unit that sets various command values for controlling the operation state of the motor; and a processing unit that controls the inverter circuit so as to provide the operation state according to the setting by the setting unit; and the setting unit sets the command value so that a load angle which is an angle between the rotor axis and motor applied voltage may be positioned on the smaller side than the load angle for providing the maximum output torque in the characteristic of load angle and output torque and wherein the inverter controller further includes a load amount detecting unit that detects the load amount of the motor, the load amount detecting unit detects the load amount by detecting any one of active current, phase difference Φ between applied voltage and motor current, phase difference a between motor applied voltage and motor induced voltage and phase difference β between q-axis of rotor axis and motor current, and the setting unit sets the operation state of the motor on the basis of the load amount obtained from the load amount detecting unit.

7. The motor control apparatus according to claim 6, wherein the load amount detecting unit detects the load amount of the sensorless motor at least either upon start of motor driving or during motor driving.

8. A motor control apparatus comprising:

an inverter circuit that supplies driving power to a motor, a motor current detector that detects the current flowing in the motor, and an inverter controller that controls the inverter circuit on the basis of the output from the motor current detector, wherein the inverter controller includes:

a setting unit that sets various command values for controlling the operation state of the motor; and a processing unit that controls the inverter circuit so as to provide the operation state according to the setting by the setting unit; and the setting unit sets the command value so that a load angle which is an angle between the rotor axis and motor applied voltage may be positioned on the smaller side than the load angle for providing the maximum output torque in the characteristic of load angle and output torque and wherein the setting unit controls the load angle according to command for commanding reactive current component in motor current, command for commanding phase difference Φ between applied voltage and motor current, command for commanding phase difference a between applied voltage and motor induced voltage, or command for commanding phase difference β between q-axis of rotor axis and motor current.

9. A motor control apparatus comprising:

an inverter circuit that supplies driving power to a motor, a motor current detector that detects the current flowing in the motor, and an inverter controller that controls the inverter circuit on the basis of the output from the motor current detecting unit, wherein the inverter controller includes a load amount detecting unit that detects a load amount, wherein the load amount detecting unit:

determines active current component of the motor current, and calculates a change amount from an active current component of the motor current that is obtained in the previous cycle, and compares the change amount with a predetermined value, and when the change amount is smaller than the predetermined value, increases gradually a reactive current component of the motor current until the change amount of the active current component of the motor current exceeds the predetermined value, or when the change amount is more than or equal to the predetermined value, judges the load amount on the basis of the reactive current component of the motor current at this time.

10. A washing machine comprising a motor, and a sensorless motor control apparatus according to claim 9 for driving the sensorless motor.

11. A drying machine comprising a motor, and a motor control apparatus according to claim 9 for driving the motor.

* * * * *

UNITED STATES PATENT AND TRADEMARK OFFICE
CERTIFICATE OF CORRECTION

PATENT NO. : 7,071,641 B2 Page 1 of 1
APPLICATION NO. : 10/896009
DATED : July 4, 2006
INVENTOR(S) : Yasuhiro Arai et al.

It is certified that error appears in the above-identified patent and that said Letters Patent is hereby corrected as shown below:

IN THE CLAIMS:

Claim 6

In column 17, line 16, please replace "a" with --α-- after "difference" and before "between".

Claim 8

In column 18, line 5, please replace "a" with --α-- after "difference".

Signed and Sealed this

Tenth Day of October, 2006

JON W. DUDAS
*Director of the United States Patent and Trademark Office*